United States Patent
Taler

(10) Patent No.: US 9,716,680 B2
(45) Date of Patent: Jul. 25, 2017

(54) EXPANDABLE GRAPHICAL ICON FOR RESPONSE TO ELECTRONIC TEXT TRANSMISSION

(71) Applicant: Jordan H. Taler, Brooklyn, NY (US)

(72) Inventor: Jordan H. Taler, Brooklyn, NY (US)

(*) Notice: Subject to any disclaimer, the term of this patent is extended or adjusted under 35 U.S.C. 154(b) by 294 days.

(21) Appl. No.: 14/673,925

(22) Filed: Mar. 31, 2015

(65) Prior Publication Data

US 2015/0312180 A1    Oct. 29, 2015

Related U.S. Application Data

(60) Provisional application No. 61/984,063, filed on Apr. 25, 2014.

(51) Int. Cl.
*H04L 12/58* (2006.01)
*G06F 3/0484* (2013.01)
*G06F 3/0488* (2013.01)
*G06F 3/0489* (2013.01)
*G06F 3/0482* (2013.01)

(52) U.S. Cl.
CPC .......... *H04L 51/046* (2013.01); *G06F 3/0482* (2013.01); *G06F 3/0488* (2013.01); *G06F 3/04847* (2013.01); *G06F 3/04895* (2013.01); *H04L 51/18* (2013.01)

(58) Field of Classification Search
None
See application file for complete search history.

(56) References Cited

U.S. PATENT DOCUMENTS

| | | |
|---|---|---|
| 5,923,848 A | 7/1999 | Goodhand et al. |
| 6,212,553 B1 | 4/2001 | Lee et al. |
| 6,549,950 B2 | 4/2003 | Lytle et al. |
| 6,727,916 B1 * | 4/2004 | Ballard ............... G06Q 10/107 715/758 |
| 6,993,563 B2 | 1/2006 | Lytle et al. |
| 7,321,920 B2 | 1/2008 | Washburn |
| 7,340,503 B2 | 3/2008 | Washburn |
| 7,353,258 B2 | 4/2008 | Washburn |
| 7,475,114 B2 | 1/2009 | Lipton et al. |
| 7,603,349 B1 | 10/2009 | Kraft et al. |
| 7,720,923 B2 | 5/2010 | Lipton et al. |
| 7,809,794 B2 | 10/2010 | Fellenstein et al. |
| 7,844,891 B2 | 11/2010 | Chandra |
| 8,117,287 B2 | 2/2012 | Washburn |
| 8,245,156 B2 | 8/2012 | Mouilleseaux et al. |
| 8,316,315 B2 | 11/2012 | Portnoy et al. |
| 8,352,573 B2 | 1/2013 | Chandra |

(Continued)

*Primary Examiner* — Kenny Lin
(74) *Attorney, Agent, or Firm* — Louis S. Horvath

(57) ABSTRACT

A graphical user interface utility for message data sent from a sender personal communications device to a recipient personal communications device displays a base response prompt, according to an instruction from the sender, in the message data that appears on the recipient personal communications device. The graphical user interface utility changes the appearance of the base response prompt when the base response prompt is selected by the recipient by displaying one or more recipient-actuable selection elements along with the message content. At least one of the one or more recipient-actuable selection elements has an associated response signal that is transmitted back to the sender according to recipient selection.

20 Claims, 35 Drawing Sheets

(56) References Cited

U.S. PATENT DOCUMENTS

| | | | |
|---|---|---|---|
| 8,549,432 B2 | 10/2013 | Warner | |
| 9,565,537 B2* | 2/2017 | Celik | H04M 1/72519 |
| 2004/0141004 A1* | 7/2004 | Cabezas | G06Q 10/107 |
| | | | 715/751 |
| 2005/0154728 A1 | 7/2005 | Greve | |
| 2006/0004703 A1 | 1/2006 | Spivack et al. | |
| 2008/0062133 A1* | 3/2008 | Wolf | G06F 3/0489 |
| | | | 345/168 |
| 2008/0263158 A1* | 10/2008 | del Cacho | G06Q 10/107 |
| | | | 709/206 |
| 2008/0320417 A1 | 12/2008 | Begley et al. | |
| 2010/0100849 A1* | 4/2010 | Fram | G06F 3/0236 |
| | | | 715/835 |
| 2012/0157067 A1* | 6/2012 | Turner | H04M 3/48 |
| | | | 455/417 |
| 2013/0091229 A1 | 4/2013 | Dunn et al. | |
| 2013/0097270 A1* | 4/2013 | Plotkin | H04M 1/72547 |
| | | | 709/206 |
| 2014/0057610 A1* | 2/2014 | Olincy | H04M 3/42365 |
| | | | 455/414.1 |
| 2014/0337441 A1* | 11/2014 | Schnitman | H04L 51/18 |
| | | | 709/206 |
| 2015/0188861 A1* | 7/2015 | Esplin | H04L 51/06 |
| | | | 709/206 |
| 2015/0271110 A1* | 9/2015 | Murray | H04W 4/14 |
| | | | 455/414.1 |
| 2015/0312731 A1* | 10/2015 | Bendi | H04W 4/12 |
| | | | 455/414.1 |

* cited by examiner

EXPANDABLE GRAPHICAL ICON FOR RESPONSE TO ELECTRONIC TEXT TRANSMISSION

CROSS REFERENCE TO RELATED APPLICATIONS

This application claims the benefit of U.S. Provisional Application 61/984,063 entitled "EXPANDABLE GRAPHICAL ICON FOR RESPONSE TO ELECTRONIC TEXT TRANSMISSION" by Taler, filed 25 Apr. 2014.

FIELD OF THE INVENTION

This invention generally relates to electronic communication and more particularly relates to an icon that is actuated and displayed for recording and displaying a response to an inquiry in an email or other text or message transmission.

BACKGROUND OF THE INVENTION

Electronic mail or email and text messaging is ubiquitous, used as a convenient and inexpensive medium for rapid business as well as personal communication. While it is extremely useful, quick, and easy to use, however, email text communication has some significant shortcomings, particularly with respect to interpersonal communications. Even among people who have some level of affinity, email and texting interaction can tend to be impersonal and terse. Various factors such as habit and attitude with respect to the ongoing proliferation of unsolicited email and text messages tends to make it acceptable to ignore or defer response to email or text messages, even when they might include a more personal inquiry or request. When the perception of the recipient has particular significance to the sender, crafting a request or a more formal response to an email takes time, focus, and effort. One word email responses can be wrongly perceived, such as appearing to be unfriendly, socially awkward, or terse, and can possibly be misdirected or lost or include typographical errors. Because it can take time to craft an appropriate and complete response, there are many instances wherein a query goes unanswered.

It can also be appreciated that there are many situations in which a message recipient has limited time or mobility for responding to a question in a text message. Repair personnel, for example, may be wearing protective gloves or other equipment that makes it difficult to interact with a small keypad or screen-based touch interface. People who must accomplish a number of tasks at one time may not be able to expend more than a few seconds on responding to a text message when responsible for other duties.

One area of particular difficulty relates to eliciting a quick response to transmitted text having a question or request. While a "Yes/No" response may be sufficient to a question in many cases, there can be instances where less certainty is possible or where a conditional response (such as "Not likely", "Don't know yet") is all that the responding recipient can provide. There is currently no quick response mechanism for responding to an inquiry that allows the recipient to answer quickly without sending a response email or other text message and without the requirement for formulating the text of a reply. In addition, there can be situations wherein the response of a recipient can only be brief, such as when the recipient can answer a quick inquiry while involved in other business, but is unable to give full attention to an email or other text message.

SUMMARY OF THE INVENTION

It is an object of the present invention to address the need for a convenient response tool for persons communicating via text transmission such as email. With this object in mind, embodiments of the present invention provide an interface utility for soliciting and entering a response to a transmitted text inquiry, wherein the utility is provided as a graphical icon that can be actuated and displayed on the computer screen of a message recipient and comprises at least first and second active selection buttons for entry of the response, wherein selection of either of the at least first and second selection buttons generates a corresponding message to the sender of the email or other text transmission, the message indicative of the recipient's response.

From an alternate aspect of the present invention, there is provided a graphical user interface utility for eliciting and acquiring a response from an email or other text message recipient, the utility comprising a set that has at least first and second selectable symbols that display, along with the text content, to the message recipient in response to instructions from the sender, wherein the set of symbols is designated by the text message sender.

From another alternate aspect of the present invention, there is provided a graphical user interface utility for message data sent from a sender personal communications device to a recipient personal communications device, wherein the graphical user interface utility displays a base response prompt, according to an instruction from the sender, in the message data that appears on the recipient personal communications device; wherein the graphical user interface utility changes the appearance of the base response prompt when the base response prompt is selected by the recipient by displaying one or more recipient-actuable selection elements along with the message content; and wherein at least one of the one or more recipient-actuable selection elements has an associated response signal that is transmitted back to the sender according to a recipient selection.

It is a feature of the present invention that it provides a method that obviates the need for a typed text response in an email reply and makes it convenient for the responder to answer a simple inquiry quickly and directly, such as with a single touch screen selection or selection from a mouse or other pointer device. Embodiments of the present disclosure allow a sender to quickly formulate a question using a standard set of templates. Embodiments of the present disclosure can allow a recipient to express varying degrees of certainty or willingness with respect to a response and, in some cases, can also allow the recipient to optionally include a short message with the response.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 4 shows migration of the selected button back toward a central icon of the response prompt.

FIG. 5 shows changing the appearance of the central icon of the response prompt according to operator selection.

DETAILED DESCRIPTION OF THE INVENTION

Figure 1A:
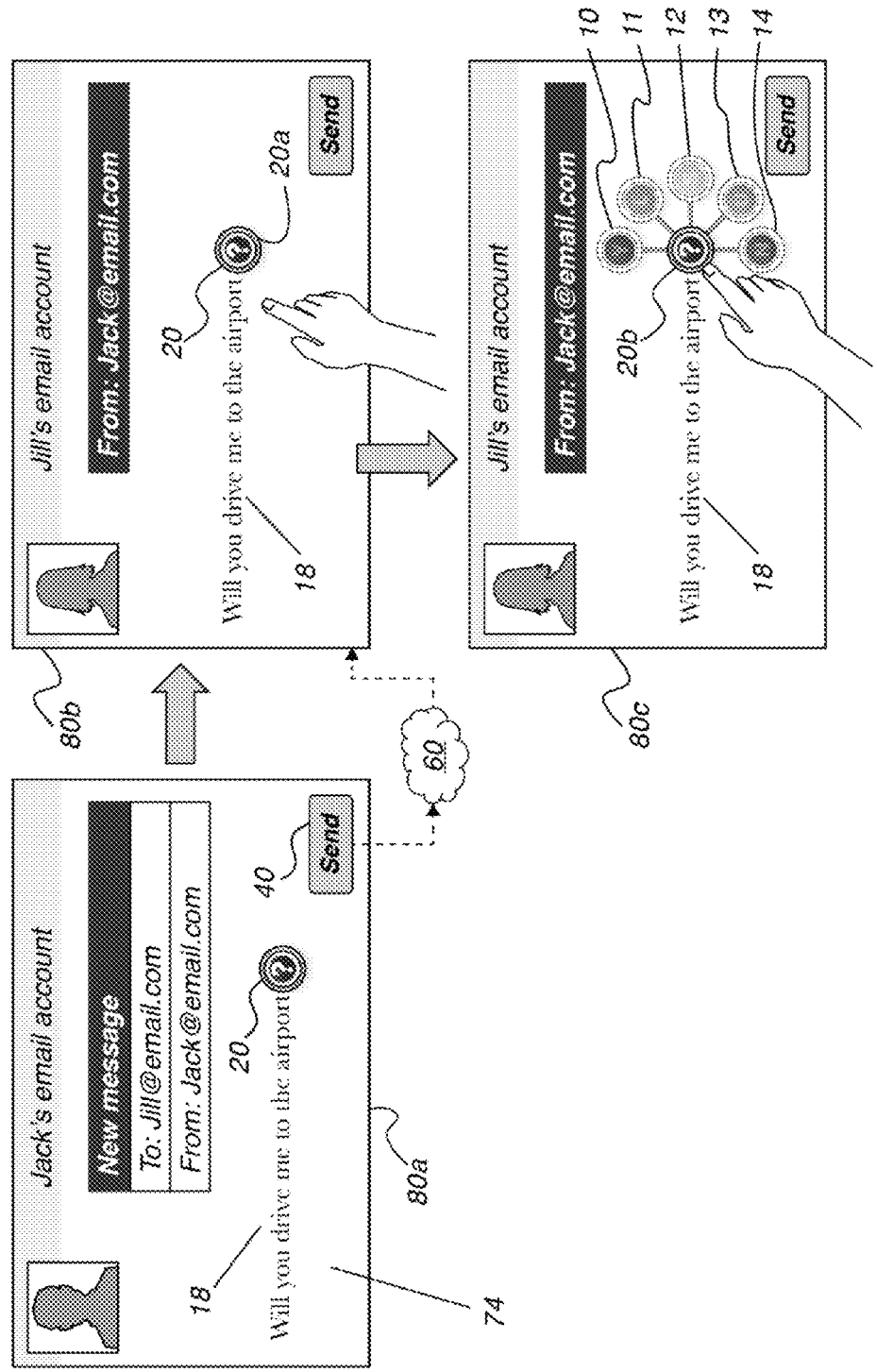
FIGS. 1A and 1B are flow diagrams that show a sequence for electronic message transmission using a response prompt according to an embodiment of the present invention.

It is to be understood that elements not specifically shown or described may take various forms well known to those skilled in the art.

Where they are used, the terms "first", "second", and so on, do not necessarily denote any ordinal, sequential, or priority relation, but are simply used to more clearly distinguish one element or set of elements from another, unless specified otherwise. In the context of the present disclosure, the terms "viewer", "operator", and "user" are considered to be equivalent and refer to the person who views content and enters commands on a computer or handheld device display.

The term "highlighting" for a displayed feature has its conventional meaning as is understood to those skilled in the information and image display arts. In general, highlighting uses some form of localized display enhancement to attract the attention of the viewer. Highlighting a portion of an image on a display, for example, can be achieved in any of a number of ways, including, but not limited to, annotating, displaying a nearby or overlaying symbol or pattern, outlining or tracing, display in a different color or at a markedly different intensity or gray scale value than other image or information content, blinking or animation of a portion of a display, or display at higher sharpness or contrast. Highlighting can be accompanied by an audible tone or identifying sound sequence.

As used herein, the term "energizable" relates to a device or set of components that perform an indicated function upon receiving power and, optionally, upon receiving an enabling signal. The opposite state of "energized" is "de-energized". The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S. Two subsets are disjoint if their intersection is the empty set, that is, if they have no elements in common. Two subsets A and B are unequal if both B is not a subset of A and A is not a subset of B. In such a case, one or more members of each subset is not a member of their intersection.

In the context of the present disclosure, the term "icon" has its conventional meaning as is well known to users of personal computer and handheld computer apparatus. The icon is a displayed symbol that is representative of a software utility that can be actuated or invoked to perform some function when selected by a user action. The invoking action may include pointing to or selecting the icon using a mouse, touch screen, touch pad, stylus, or similar pointing or selection device, then using a sequence such as successive mouse clicks or tactile stimulus or tapping, etc., as is familiar to those who use personal computers or handheld phones or other communication and processing devices that have an accompanying display.

In the context of the present disclosure, the phrase "electronic text transmission" refers to an electronic message that is transmitted from a sender at one site and is addressed to a receiver or recipient at another site. Types of electronic text transmission include email, SMS (short message service) text, or text messages transmitted in some other format. Images, emoticons, and other non-textual content may also or alternately be included. Transmission can be wireless, such as to a smartphone or iPad (Apple Inc.) or other tablet computer, or wired, such as over an ethernet network, or may utilize a combination of wired and wireless links between the sender and recipient site addresses. References to "email" in the description that follows are considered to include SMS and other types of text transmissions that are sent from a sender at one site address to a recipient at another site address or sent in response from the recipient back to the sender.

In the context of the present disclosure, the general terms "personal computer", "computer device", or "personal communications device" are considered to be equivalent and are broadly used to encompass laptop or personal computers as well as any of a number of types of wireless mobile or portable personal communications devices that may be installed at the recipient site or may be carried by a customer. Devices carried by the customer can include personal communications devices such as cellular phones, so-called "smartphones" that provide some type of mobile operating system, feature phones having at least some measure of computing capability, and various types of wireless, networked electronic pads, computerized tablets, and similar devices that include at least a display area capable of displaying text and graphic content and a mechanism for icon and on-screen button selection and for entering data, such as phone numbers, message text, and prompt responses, for example. The mechanism for data entry typically includes a touch screen and may also include a keypad. Examples of types of personal communications devices that can be particularly useful for embodiments of the present invention include smartphones such as the Android™ smartphone platform (Android is a trademark of Google, Inc.), the iPhone (from Apple Inc.), tablet computers in general, smart watches, and devices with similar capability for downloading and executing one or more sets of programmed instructions, such as software applications that are widely referred to as "apps" that display on the device.

In the context of the present invention, the term "app" is considered to be synonymous with the phrase "software application" or "software application program" as a type of software "utility" and relates to a set of one or more programmed instructions that execute on a computer or other logic processor, such as the logic processor that controls operation of a smartphone or other personal communications device. The personal communications device has a particular, unique electronic address, typically an IP address or phone number, but optionally some other type of wired or wireless address.

In the context of the present disclosure, an electronic message can be a message that has text message data, but can also include a message that has some other type of data in addition to, or instead of, text data, such as image data or other message data. The body of the message that is sent from a sender to a recipient is typically a text message, as shown in the examples given herein, but can also or alternately include non-text symbols, such as emoticons, as well as images and other content.

The phrase "graphical user interface utility" has its standard meaning as would be understood by one skilled in the communication arts and refers to a software application program that runs on a computer or other processor and causes the computer or processor to execute programmed instructions for displaying prompts, icons, message content, and various graphical elements that can be selected by the viewer or user in order to execute an instruction or initiate a process, such as transmitting an instruction or a response signal, for example.

In the context of the present disclosure, the terms "sender" and "recipient" or "receiver" generally refer to the respective users sending and receiving messages at their personal communications devices. The terms "sender" and "recipient" may also be used more casually, simply to refer to the corresponding communications devices of the sending user and receiving user.

Embodiments of the present invention provide a graphical user interface utility that, when appropriately accessed and actuated, displays an on-screen response icon, referred to herein as a "configurable response prompt" or SMART-MARK, on at least the personal computer of the message recipient and allows an email or other text message recipient to respond to an inquiry from a sender quickly and even asynchronously with respect to conventional response to a typed email or other text reply that is sent using standard electronic mail or messaging procedures.

The configurable response prompt of the graphical user interface utility has the ability to respond to a question or indicate a preference or selection embodied within a text message, or other type of message, in real time using the internet or other suitable network mechanism. Typical answer options for the question text are often taken from a small set of possible responses to basic queries such as, but not limited to Yes, No, Likely, Unlikely, and Short Answer (with optional additional typed-in text from the recipient). Each answer option can have a selectable displayed command button, optionally given a particular color assignment. The optional color and shape variation is ideally but not limited to Green, Lime, Yellow, Orange, and Red circles that display and operate in a familiar manner as on-screen "buttons". In embodiments described herein, the configurable response prompt is shown with as many as 5 answer options (each option represented by a selectable button). The response prompt can offer additional selection button options, such as up to a hundred or more, for example, each having a corresponding signal that is transmitted back to the sender when selected by the responding recipient. Limitations on number of available answer options can be based on factors such as screen size and response complexity, for example.

Figure 1B:
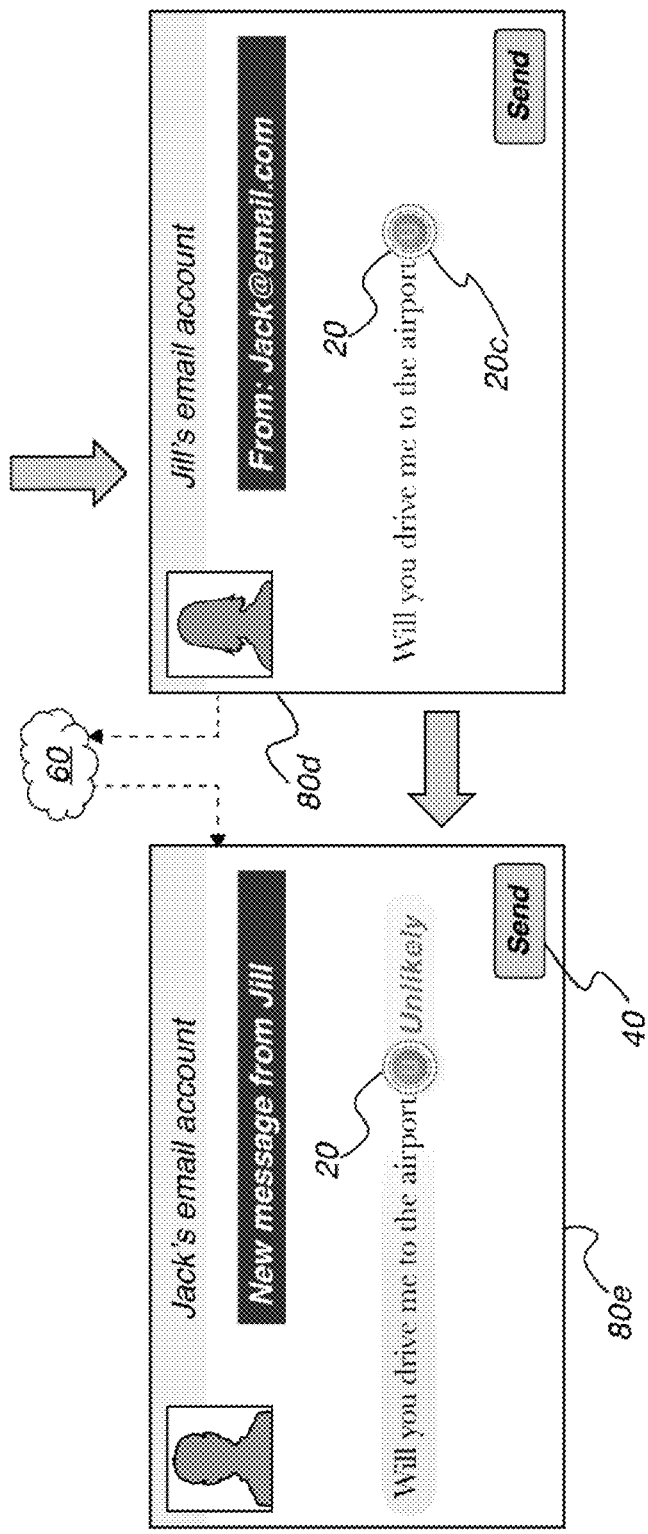

FIGS. 1A and 1B show an email interaction sequence between two users, Jack as sender and Jill as recipient, each with an email account and each operating on a corresponding computer or other personal communications device. Messages between these sending and recipient users are typically sent in wireless form over internet 60 or other suitable network, including telephone transmission channels or other conventional network types. Supporting FIGS. 2-5 show exemplary behavior of a response prompt, in enlarged form, during this sequence. In the particular example sequence of FIGS. 1A and 1B, email messages for Jack display in windows 80*a* and 80*e* on Jack's personal communications device; email messages viewed by Jill display in windows 80*b*, 80*c*, and 80*d* on Jill's personal communications device.

Beginning in FIG. 1A, in a displayed window 80*a*, Jack as sender, connected to the internet and addressable via his email client, composes an email text message 18 to Jill as recipient. Within a message body 74 of message 18, the sender inserts a configurable response prompt 20, using any of a number of instruction sequences for prompt insertion, as described in more detail subsequently.

In the FIG. 1A example, Jack writes a "question sentence" (example: "Will you drive me to the airport?") in the text string or message body of email text message 18. Jack inserts configurable response prompt 20 as a type of question mark or at another appropriate point in the message body, as described above, and sends the email to Jill, entering the send command from Send button 40 to transmit the email over internet 60.

To encourage interaction and indicate status, the appearance of configurable response prompt 20 changes during the interaction sequence between sender and recipient, as shown in the FIG. 1A-1B sequence. Window 80b shows the display of Jack's email text message 18 in Jill's email account on her personal communications device. Configurable response prompt 20 initially displays as a base icon 20a at the corresponding point in the text string, with appearance that indicates that the icon is in an "unanswered" state. Jill can now answer Jack's question sentence by selecting and thus activating the configurable response prompt 20. Selection of the icon for response prompt 20 can be a touch screen touch or tap, a mouse click, a stylus touch, a keypad key or sequence, or other selection command entry that is used on Jill's personal communications device.

Window 80c in FIG. 1A shows the response of the as-yet "unanswered" configurable response prompt 20 to recipient selection. Response prompt 20 now appears as an expanded prompt icon 20b, expanding on the display to show a number of recipient-actuable selection elements, such as a set of user selectable buttons 10, 11, 12, 13, and 14. These selectable buttons 10, 11, 12, 13, and 14 display an "answer tree" of quick responses for recipient entry. Jill's screen also displays the text message 18 from Jack's entered text string FIG. 1B shows window 80d for the recipient following selection, in which response prompt 20 now has the appearance of an answered prompt icon 20c. In window 80d, Jill's display shows the status of her response selection. A window 80e then shows response prompt 20 with this same appearance as it displays to Jack on the sender's device.

It should be noted that Jill's response can appear on Jack's display asynchronously with respect to the text message response. Thus, for example, the response could appear in advance of, or in place of, a typed text response to Jack's original text message of window 80a. Through the internet (or process of web server synchronizing Document Object Model Scripting) or other wireless transmission channel, Jill's response can promptly appear in Jack's original email message or in a listing that shows recent messages for his account in "real time". Her response can have a similar appearance as shown in the prompt icon 20c of window 80d as shown.

Figure 2:
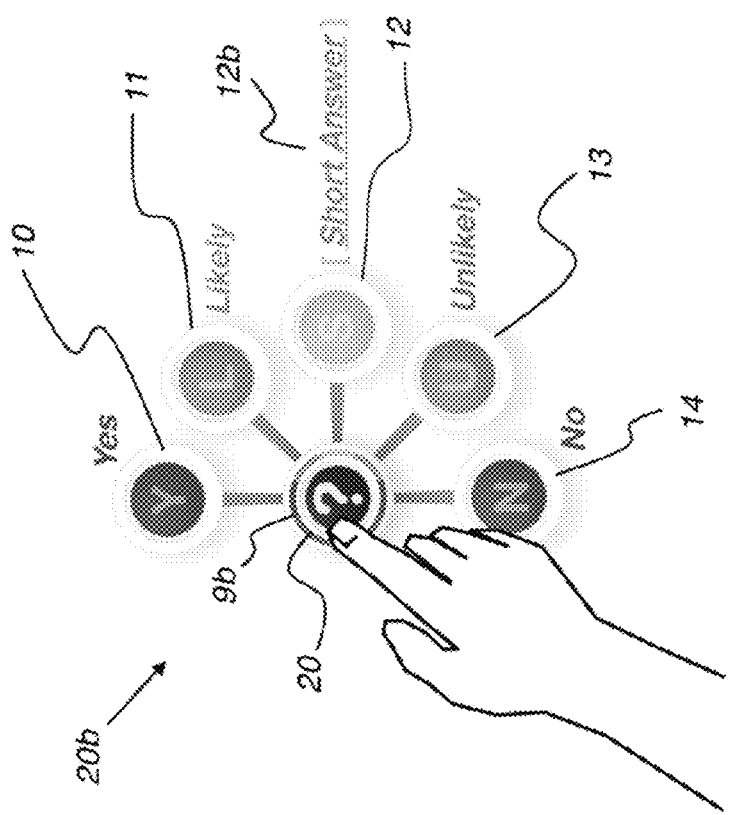
FIG. 2 is an enlarged view of the configurable response prompt in an expanded form showing the set of available selections.

By way of example, FIG. 2 shows, in enlarged form, an example of response prompt 20 as expanded prompt icon 20b with an arrangement of recipient-actuable selection elements, shown in this example as selection buttons 10, 11, 12, 13, and 14 arranged about a central icon 9b. Corresponding text is provided alongside each of the selection buttons 10, 11, 12, 13, and 14. In this example, the buttons 10, 11, 12, 13, and 14 can be colored, shaded, or otherwise visually presented according to their relative significance or meaning in the context of the message contents. According to an embodiment of the present disclosure shown in FIG. 2, for example, the selectable quick response options can include: "Yes," represented by a green selectable button 10; "Likely" represented by a lime selectable button 11; "Short Answer," represented by a yellow selectable button 12, "Unlikely" represented by an orange selectable button 13; and "No" represented by a red selectable button 14. Central icon 9b itself has an appearance that indicates an unanswered state. Each member of the set of selection buttons has an associated response signal wherein, when a selection button is selected by the recipient, the corresponding response signal is transmitted back to the email sender. The response signal may be transmitted either immediately upon button 10, 11, 12, 13 or 14 selection; or when the recipient enters a "Send" instruction for a response to the electronic text message that includes the configurable response icon. The response signal may include encoded data, such as text data, emoticon or other non-text data, image data, dynamic or streamed information, or other data.

For the example of FIG. 2, if the "Short Answer" selection button 12, is activated (via a touch screen or mouse click selection for example) a text field 12b displays to the recipient. The recipient may type a short text answer corresponding to button 12, which may be constrained by a character count to within a predetermined number of characters, such as 37 characters, for example. For this response selection, the text string that is entered in text field 12b is also transmitted back to the sender device as part of the signal indicating the recipient's response.

In the example sequence of FIGS. 1A and 1B, Jill is unwilling or unable to commit to a "Yes" response to the question sentence and may be uncomfortable writing a verbose and complicated excuse for not driving Jack to the airport. Instead, she simply selects the response "Unlikely" selection button 13 from the expanded prompt icon 20b to indicate that she is "Unlikely to drive Jack to the airport".

Figure 3:
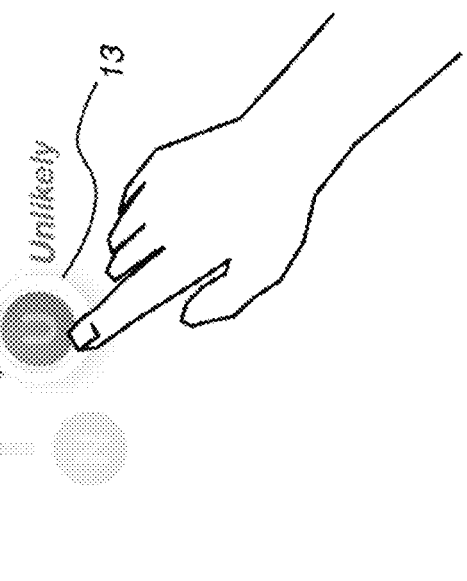
FIG. 3 is an enlarged view of the configurable response prompt showing the result with selection of one of the available selectable buttons.

As shown in FIG. 3, Jill's selection of selection button 13 or other type of recipient-actuable selection element can persist on the display screen of her personal communications device. For persistence, supporting software for the configurable response prompt defocuses or dims the other response options in the set, such as in the answer tree shown in FIG. 2, which can gradually fade and disappear. This changing display sequence following selection can continue for displaying answered prompt icon 20c as shown in FIGS. 4 and 5; as displayed, the selected button can optionally migrate back over the position of the central base icon 9b, replacing the display of base icon 9b as shown.

The sequence described and shown with reference to FIGS. 1A through 5 allows the recipient to select (or ignore) the selectable configurable response prompt 20 that displays in a received electronic text message. Once response prompt 20 is selected, the graphical user interface utility that generates and controls response prompt 20 appearance can provide an intuitive display of response prompt 20 at different stages of the response sequence. As was shown in FIG. 3, the selected button 13 or other recipient-actuable selection element can be highlighted while unselected buttons or elements dim or fade. Movement can also be provided, as shown in FIGS. 4 and 5, such as with migration of selected button 13 over the position of central icon 9b. It can be appreciated that there can be any of a number of variations on this type of sequence, which can also be combined with animation, sound, highlighting, color change, or blinking of the displayed icon at various stages in the response sequence.

Figure 6A:
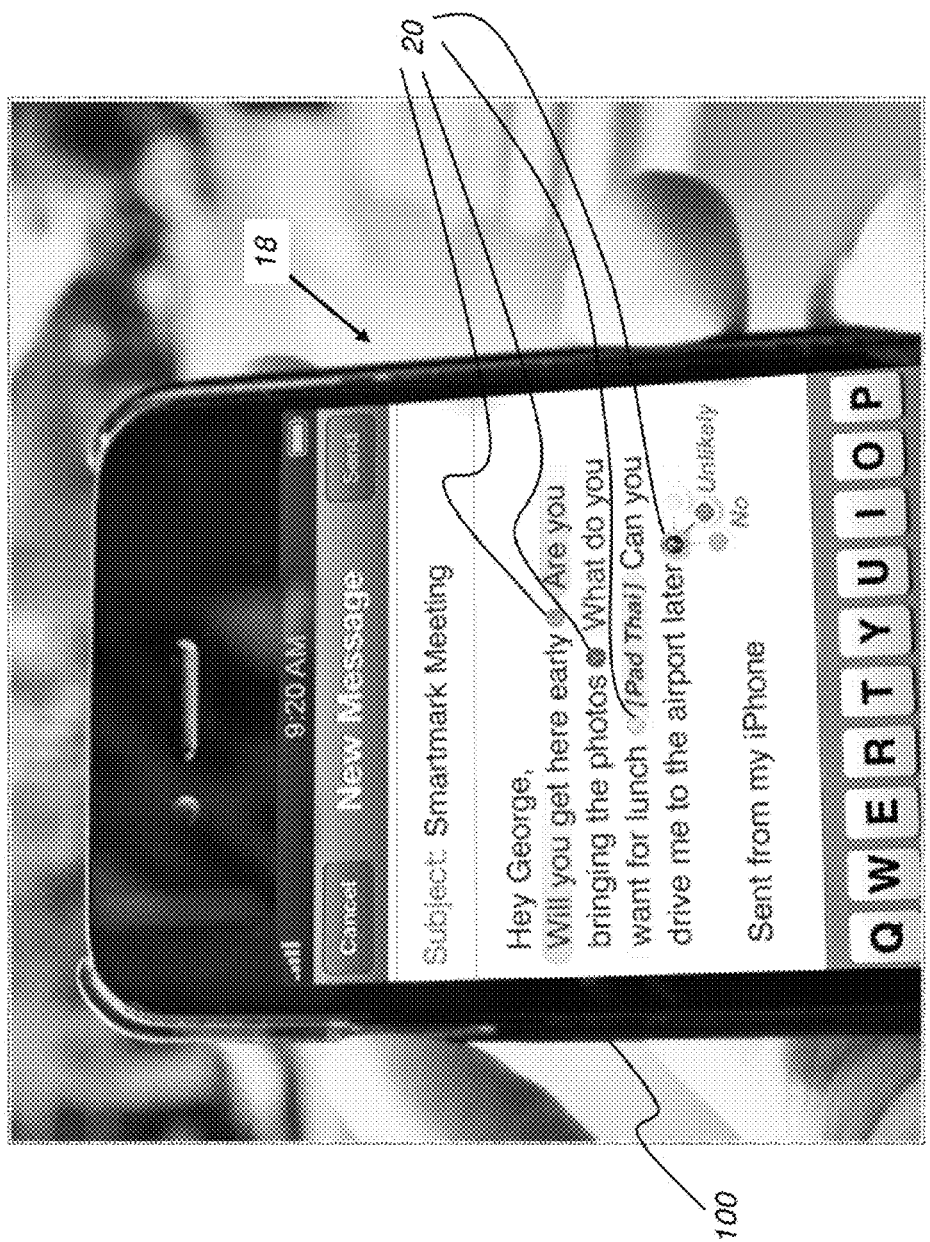
FIG. 6A shows display of multiple configurable response prompts in a single email message.
Figure 6B:
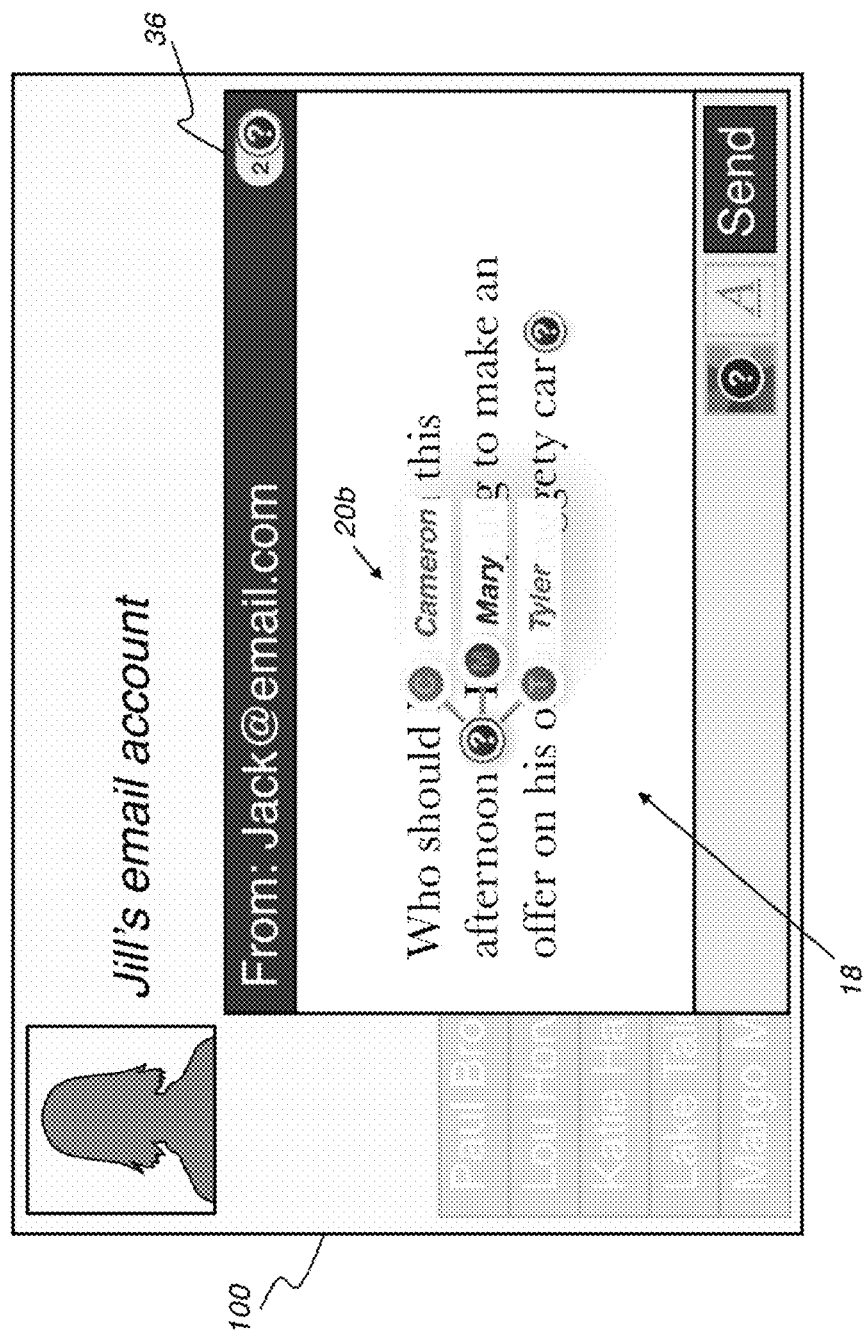
FIG. 6B shows a configurable response prompt displayed on top of message text.

FIGS. 6A and 6B show example displays of text messages 18 sent on different types of personal communications devices 100 and using one or more configurable response prompts 20. In the example of FIG. 6A, multiple configurable response prompts 20 are included in a single text message 18. Each response prompt 20 can be differently configured, such as to ask a different question or offer options for recipient selection, as described in more detail subsequently. FIG. 6B shows an expanded response prompt 20b displayed on top of message text. This can be the appearance of expanded response prompt 20b following recipient selection.

According to an embodiment of the present disclosure, configurable response prompt 20 responds to hovering, such as with a mouse or touch screen, so that response prompt 20 displays differently when user attention appears to be directed to the icon. Thus, for example, if the processor on the personal communications device 100 detects the proximity of a mouse pointer, stylus, or finger, the response prompt 20, or different portions of the prompt 20, can be highlighted or shown at higher contrast. The display may also show transient text associated with the response prompt 20, such as "help text", displayed during hovering.

An electronic text message that is broadcast to multiple recipients can also include a configurable response prompt 20. This would allow the sender to send a query for which it is useful to know the number of recipients who provide each given response. For example, message participants could use this utility to "vote" on a particular set of selections.

Various types of support tools and indicators can be provided to make it easier for the recipient to respond. For example, FIG. 6B also shows an indicator icon 36 that indicates that a configurable response prompt 20 is included in a received message. An integer "2" in the example shown gives the number of response prompts 20 that are contained in a message. The appearance of indicator icon 36 can also change to show the status of responses, such as whether or not the received prompt or prompts 20 have been answered or are still pending recipient action.

Figure 6C:
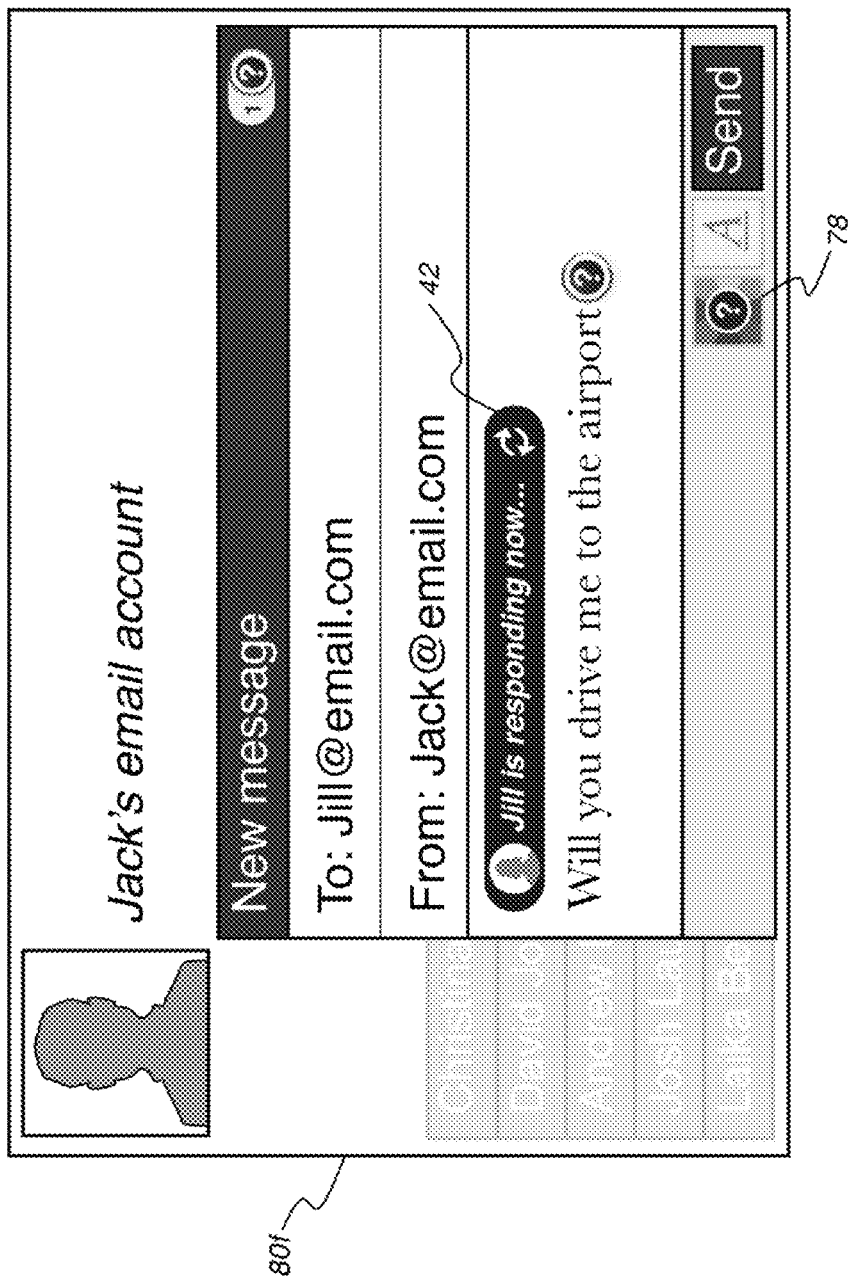
FIGS. 6C and 6D show status icons for various response conditions.
Figure 6D:
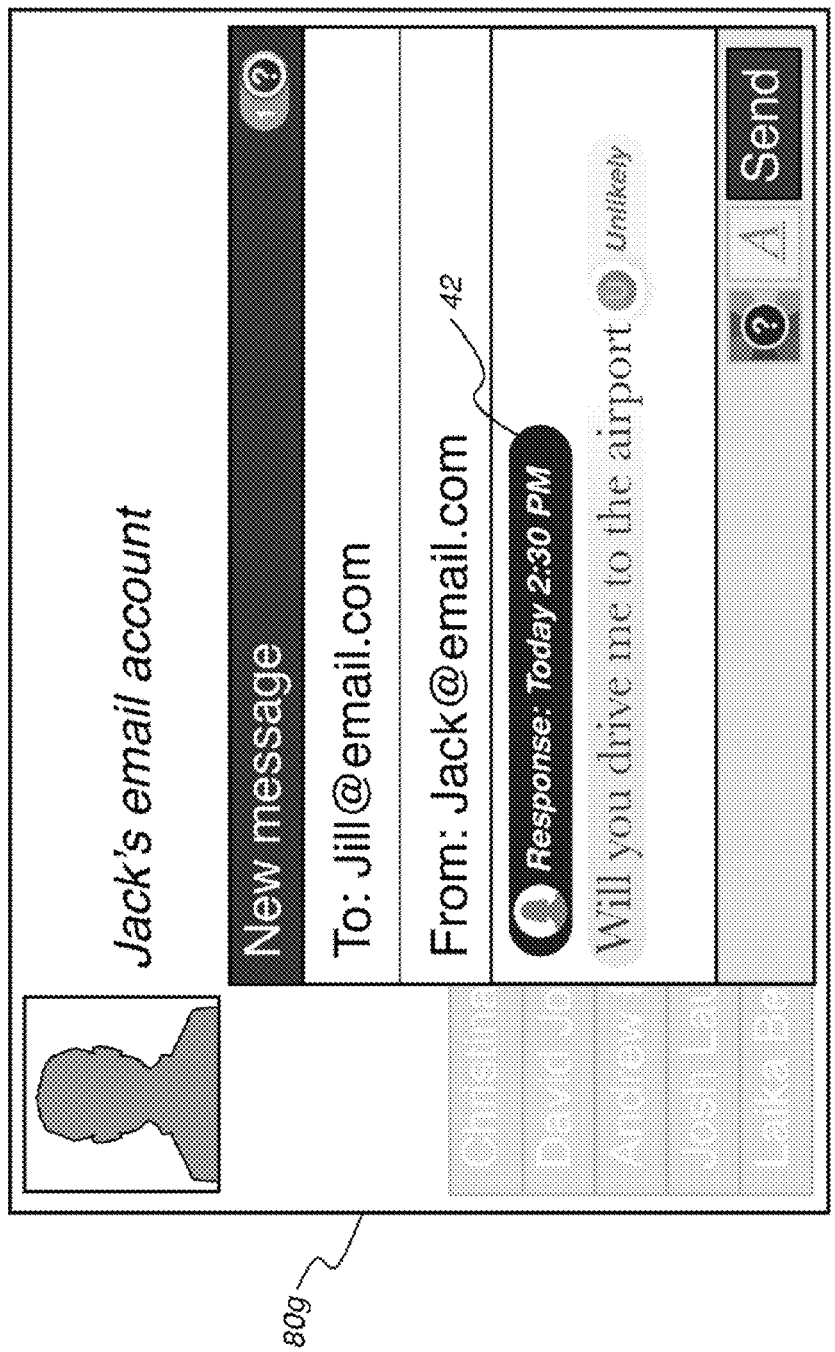

FIG. 6C shows a window 80f on the sender device with a status icon 42 that indicates activity on the part of the recipient of a text message. Status icon 42 can also indicate a response time for an answered prompt, as shown in the example window 80g of FIG. 6D.

Entering the Response Prompt in a Text Message

The instruction sequence for inserting configurable response prompt 20 at a location in a text message can be an encoding for entering a non-alphanumeric character, such as holding down or activating a keyboard key entry while entering or typing a second key, for example. For the example system shown in FIG. 1A, Jack uses a keyboard shortcut, such as "option+command+?" or other sequence of control keys on a keyboard that displays for text message entry. Alternately, an on-screen icon or command can be manually selected to insert the configurable response prompt 20 at a text cursor position. FIG. 6C shows an entry button 78 that inserts a response prompt 20 at an indicated point in a text message string, such as at the text cursor position. An event listener code could alternately be used.

Figure 7A:
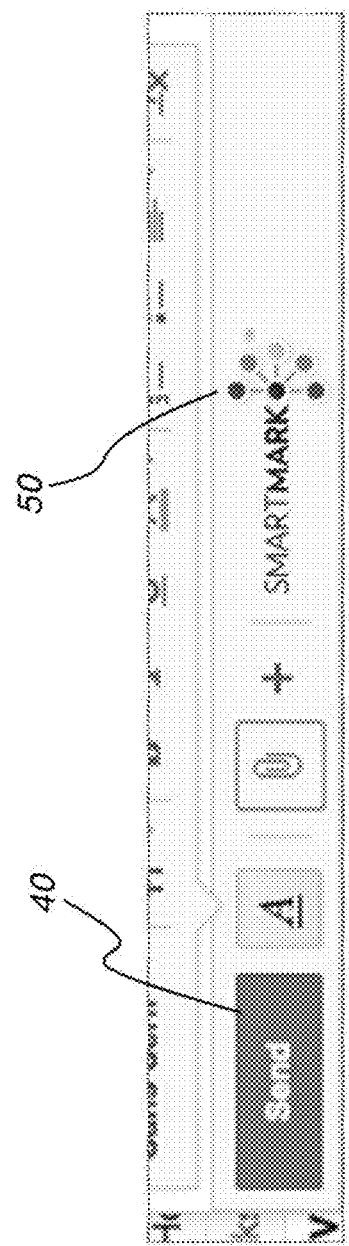
FIG. 7A shows an on-screen command entry for adding a configurable response prompt within an email transmission.

FIG. 7A shows an alternate method for including the configurable response prompt 20 in an email message. As the email sender drafts the email, the option of entering a configurable response prompt 20 is presented in the email utility, such as by a response prompt insertion button 50, labeled SMARTMARK in the example shown, along the base of the window used for typing the email text. Where a question requiring recipient response occurs, the sender selects response prompt insertion button 50. Selection of button 50 may present a menu of pre-configured response prompt types that are stored and are available for message insertion, for example.

Figure 7B:
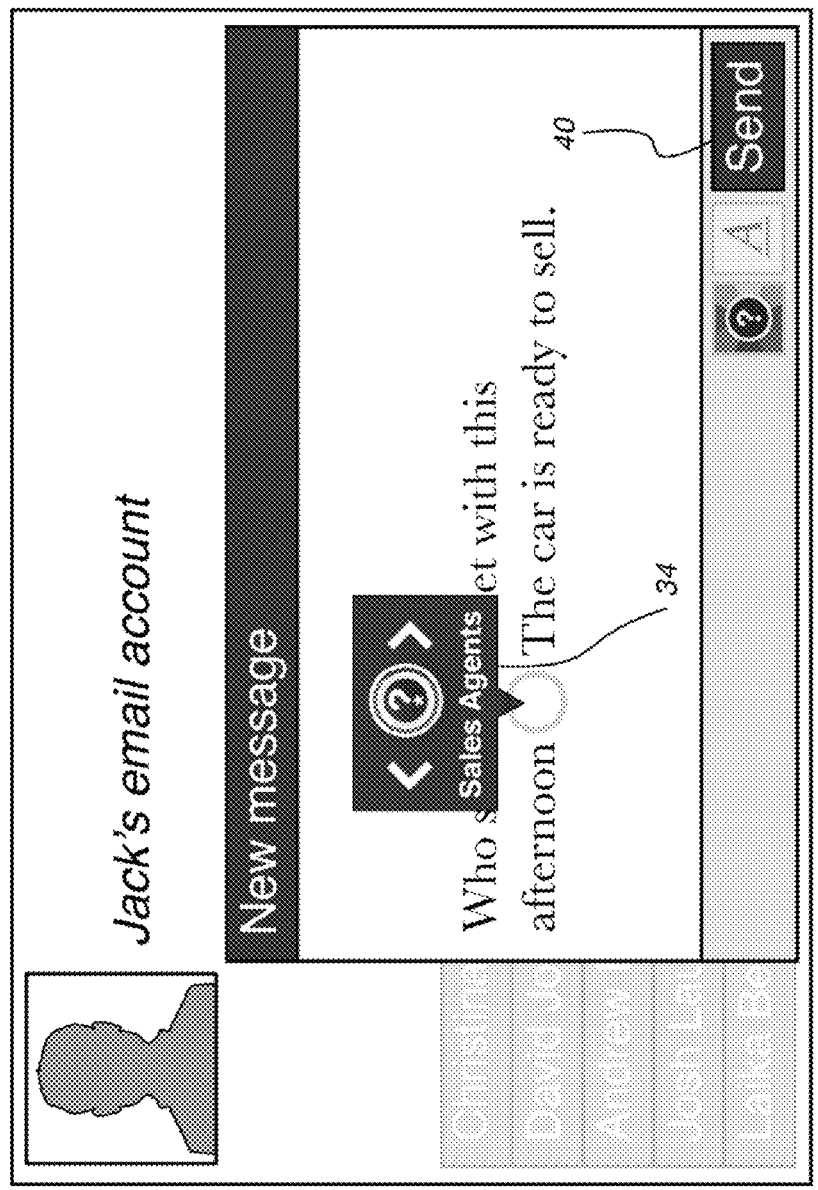
FIG. 7B shows inserting a selected response prompt within an email message.

FIG. 7B shows a displayed selector icon 34 that displays at the text cursor position when insertion button 50 of FIG. 7A is activated. Selector icon 34 enables the sender to select a suitable choice from a menu or other listing of available configurable response prompts 20. The selected response prompt 20 can use a custom prompt icon or a standard prompt icon that is provided as part of the response prompt graphical user interface utility.

Continuing with the FIG. 7B example, with the email message completed and one or more inserted configurable response prompts 20 entered, the sender then selects a Send button 40 to transmit the email message. It can be appreciated that any of a number of types of on-screen entry buttons can be provided for adding a particular configurable response prompt 20 to a text string or message.

Multiple different arrangements of configurable response prompt 20 can be set up, either within a default "library" of response prompt 20 designs, or separately designed by a user for a particular application. For example, a default library of configurable response prompts 20 may include pre-set icons for "Yes/No", "Yes/No/Unsure", "Now/Not now/Never/Try later" and other responses for standard queries.

According to an embodiment of the present disclosure, configurable response prompt 20 can also affect the color of surrounding text. Thus, for example, the text of a sentence that immediately precedes or surrounds the inserted configurable response prompt 20 can appear in a color that matches the recipient's response. Highlighting can be used to accentuate text appearance for text associated with a configurable response prompt 20.

Changing the Selection

It can be appreciated that there are a number of alternative actions and possible responses relating to situations such as time delays, change of mind or plans of the recipient, and the like. The design of the configurable response utility that controls the behavior of configurable response prompt 20 anticipates a number of possible interactive sequences for this reason.

Figure 8A:
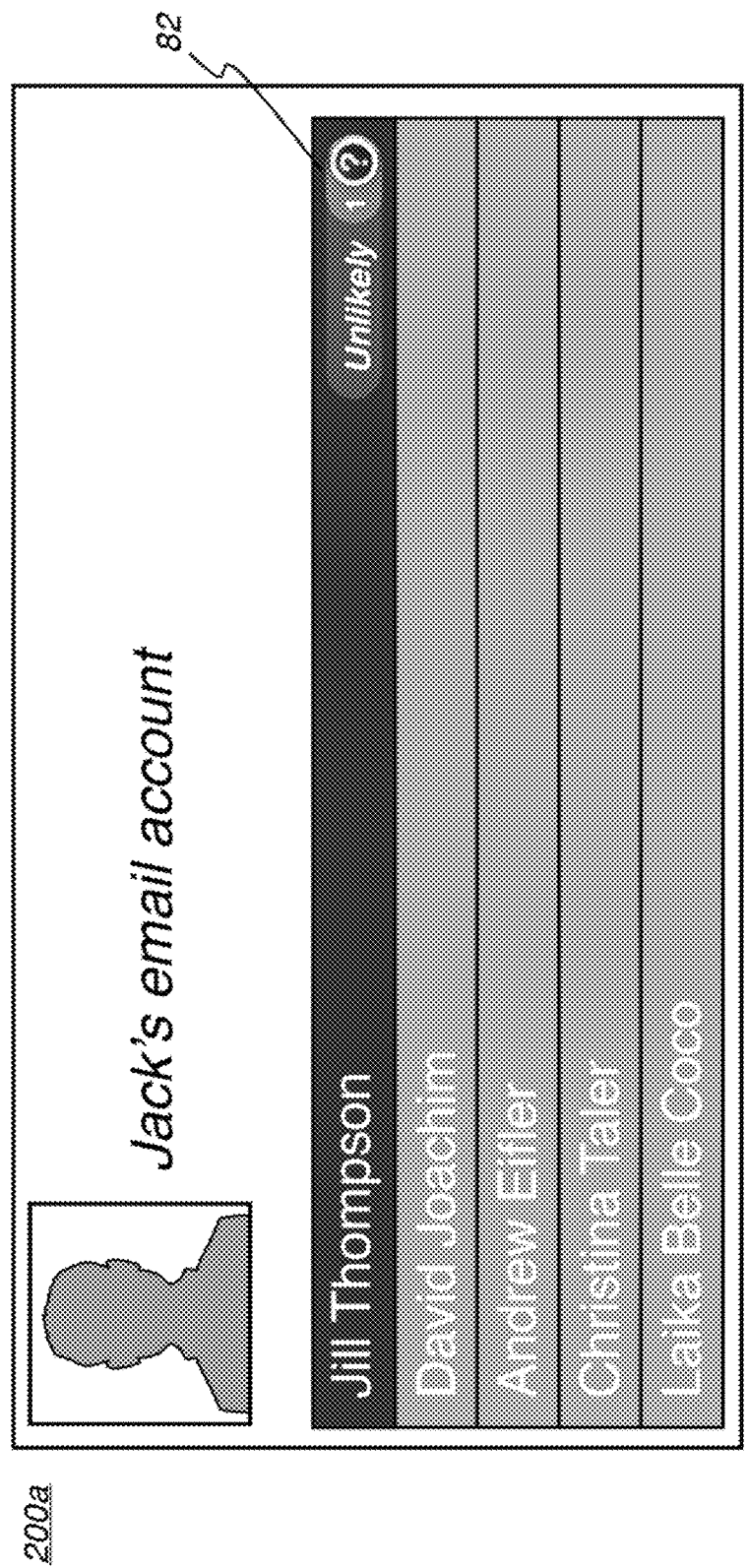
FIGS. 8A through 8E show interface windows for an alternate response sequence in which the recipient changes a previous response.

FIGS. 8A through 8E show example interaction in which the recipient Jill changes her mind following the initial transmission/response sequence that was described with reference to FIGS. 1A and 1B. FIG. 8A shows an email window 200a for the sender of a message with a configurable response prompt. In this example, recipient Jill is listed in Jack's email with an indicator icon 82 that shows that Jill has sent a response and shows that the response message contains one response to the configurable response prompt.

Figure 8B:
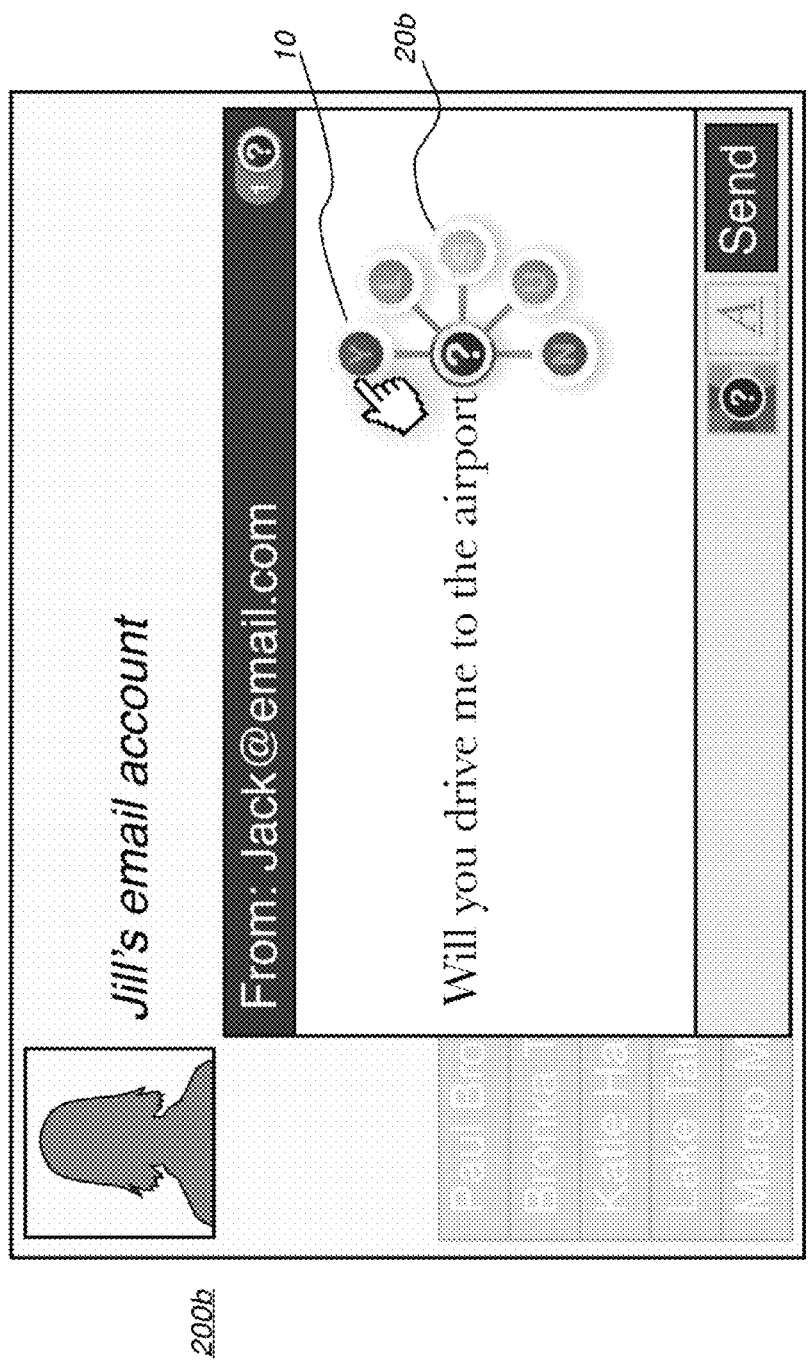
Figure 8C:
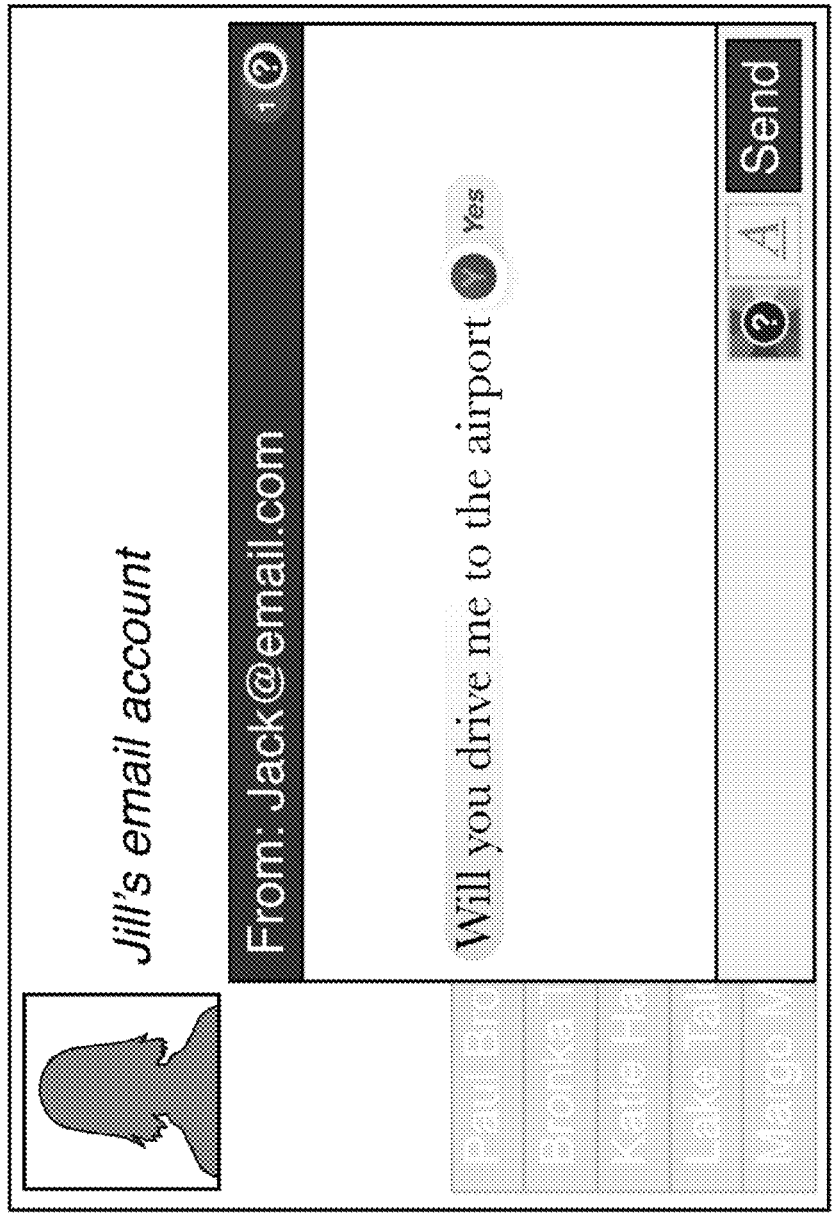
Figure 8D:
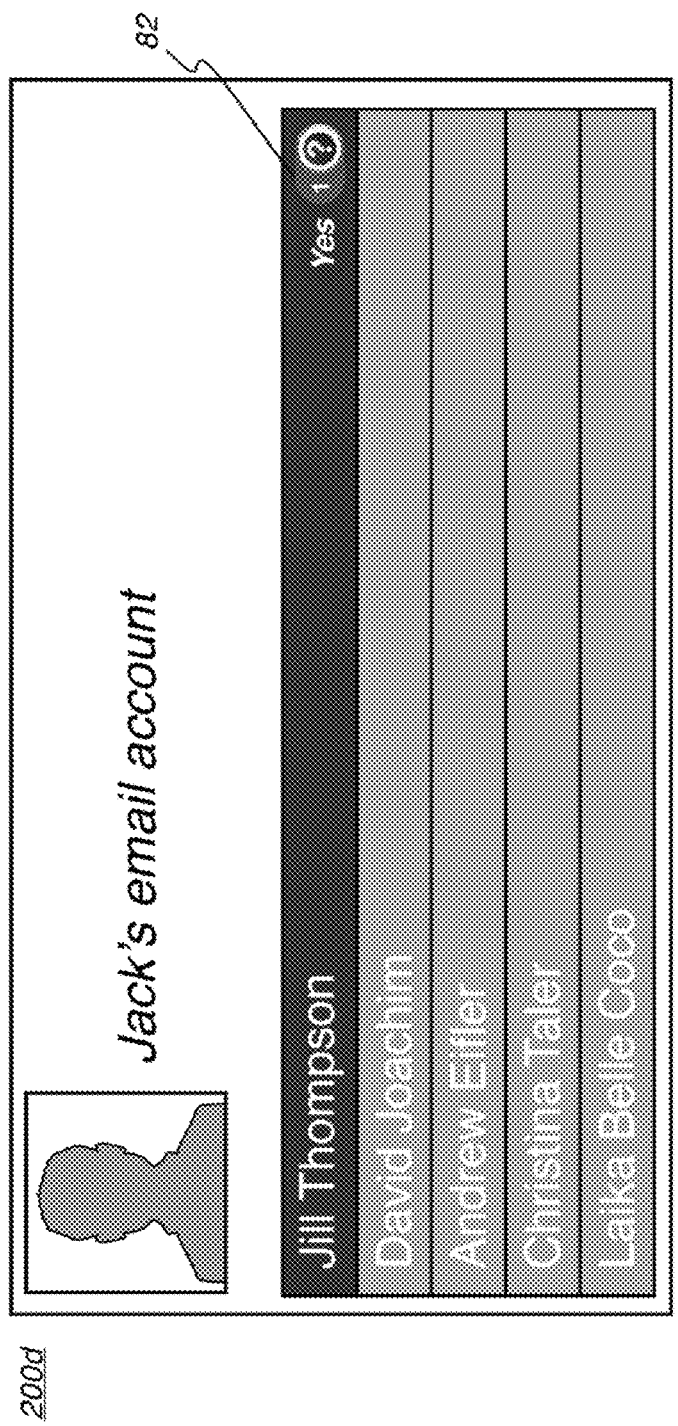
Figure 8E:
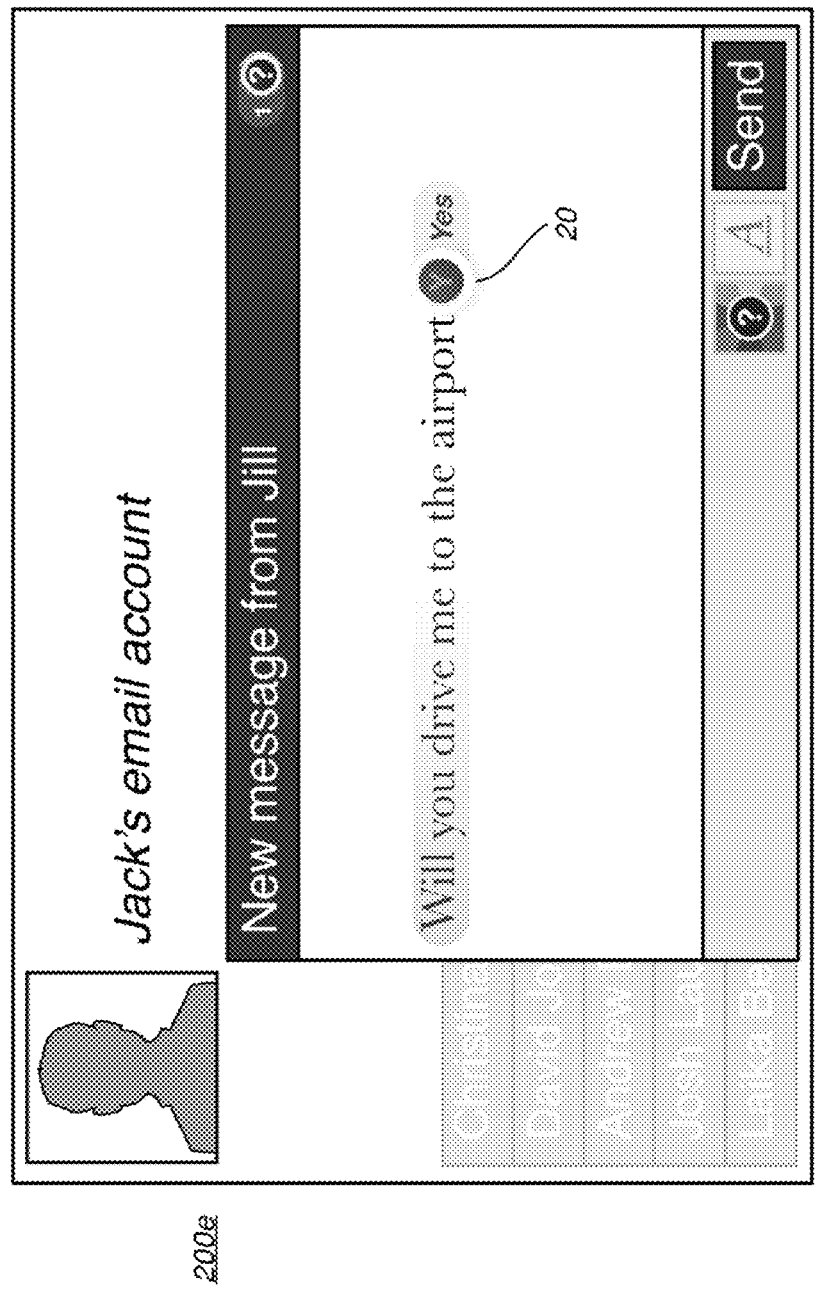

FIG. 8B shows what happens when Jill revisits her response from window 80d in FIG. 1B. In a window 200b, re-selection of the configurable response prompt invokes expanded prompt icon 20b, as described previously with reference to FIG. 2. This time, Jill selects the Yes selectable button 10. As shown in FIG. 8C, a window 200c on Jill's communications device now shows her alternate response. FIG. 8D shows a window 200d with an alternate appearance to indicator icon 82, such as change in background color or shading, showing receipt of Jill's changed response. FIG. 8E shows a window 200e that shows how this change of response appears as response prompt 20 to the sender, Jack, upon opening email response from Jill.

Figure 9:
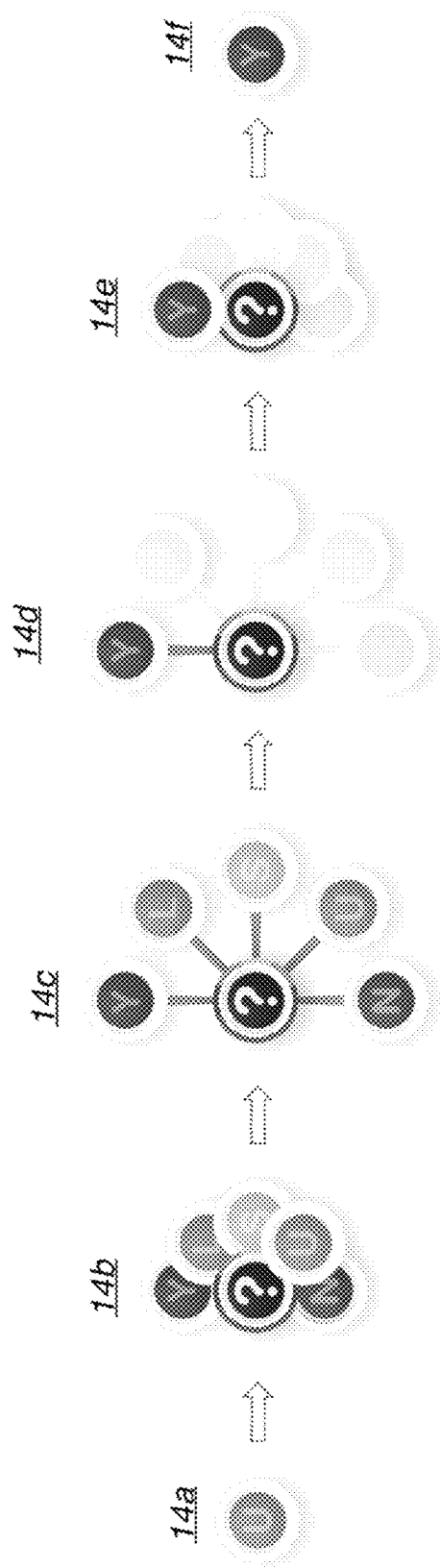
FIG. 9 shows a sequence for icon display at the recipient's computer device corresponding to a change of mind.

FIG. 9 shows a sequence for icon display at the recipient's (Jill's) computer device corresponding to the change of mind described with reference to FIGS. 8A-8C. In the progression shown from left to right, a response prompt, Answered state icon 14a is re-activated by the recipient and appears as a response prompt, Reopening state icon 14b, which can have an animated appearance as the icon "expands" and as a response prompt, Reopened state icon 14c. Jill's response provides a response prompt, New response state icon 14d. The new icon is shown as a response prompt, Collapsing state icon 14e and as a response prompt, Answered state icon 14f.

Infrastructure

The response prompt utility described herein offers a graphical user interface utility that can be provided to clients who send and receive messages in a number of ways. According to an embodiment of the present invention, the mail client or other service provider makes this utility available to its subscribers. That is, the service provider that provides email accounts to a number of users also provides the configurable response prompt capability as a built-in or optional utility for its clients.

A small amount of configuration information and software is provided for initiating display of the response prompt and for specifying its appearance, including setting up configurable features such as number and color of the selectable buttons.

According to an embodiment of the present invention, setup information for each type of response prompt is stored on a server, so that the sender only provides a unique identifier or other code that identifies the particular response prompt 20 configuration needed for a message. A library of available response prompts can be prepared by the service provider and made available for download as needed.

Alternate methods for providing the response prompt include transmitting executable code that is embedded within or transmits with the text message. The graphical user interface utility that provides configurable response prompt 20 can also be provided by a software or app provider for a smartphone or other personal communications device 100. This can be the manufacturer of device 100 or a service provider that provides wireless communication and networking services to its clients. According to an embodiment of the present disclosure, two users who have accounts with the same service provider can share full capability of the graphical user interface utility that provides configurable response prompt 20. If only one of the participants is enabled to use this utility, default behavior is provided, such as by providing the icon information and selections as a text string rather than graphically to the non-participant. Alternately, the recipient can be directed to a URL or other address at which answered response prompts can be viewed in their appropriate form.

Response Prompt Setup, Configuration, and Initiation

For initial setup of response prompt behavior and graphics, a graphics designer and/or a programmer can collaborate to write a script or other program that executes the configurable response utility. A designer can choose the animation properties, colors, and fonts of the response prompt icon or other displayed mechanism. It can be appreciated that the design and aesthetics of the configurable response prompt 20 can vary from that described in examples given herein. Animation properties, colors, button shapes and sizes, and fonts can also change within the scope of the present invention.

Figure 10:
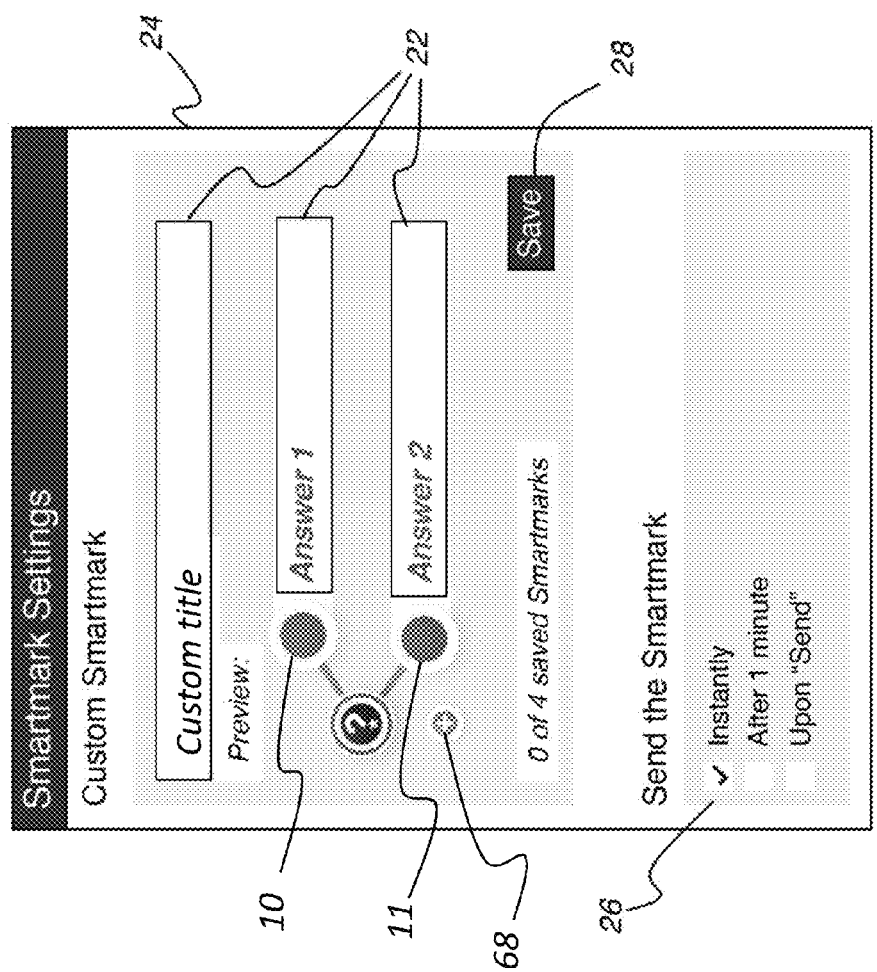
FIG. 10 shows a custom setup utility for a response prompt.

FIG. 10 shows a setup utility 24 that is available for a subscriber to an email client or other message server, wherein the utility 24 is used to generate a custom response prompt with a given setup of selections and fields. Text fields 22 allow the person setting up the response prompt to provide a title and to label answer entries for two or more selectable buttons 10, 11. An add icon 68 can be selected to allow additional buttons to be added. Response behavior selections 26 allow setup alternatives for how quickly the response is sent. Three exemplary options are shown in the FIG. 10 example:

(i) Instantly. The response can be sent instantly, as soon as the recipient responds, so that it is sent separately (asynchronously) from the response to the text string or message;

(ii) After a given time period. A time delay following response can be provided. This time delay can be fixed or variable.

(iii) Upon "Send". The response can be sent along with the text of a Reply message, when the recipient enters the Send command using the email or other message utility.

Response behavior selections 26 can be set for a particular type of response prompt or as default settings for any received response prompt. According to an embodiment of the present invention, the default setting for responses is "Instantly". A "save" button 28 is provided for saving the response prompt setup. The response prompt can then be stored and accessed using its title.

Figure 11:
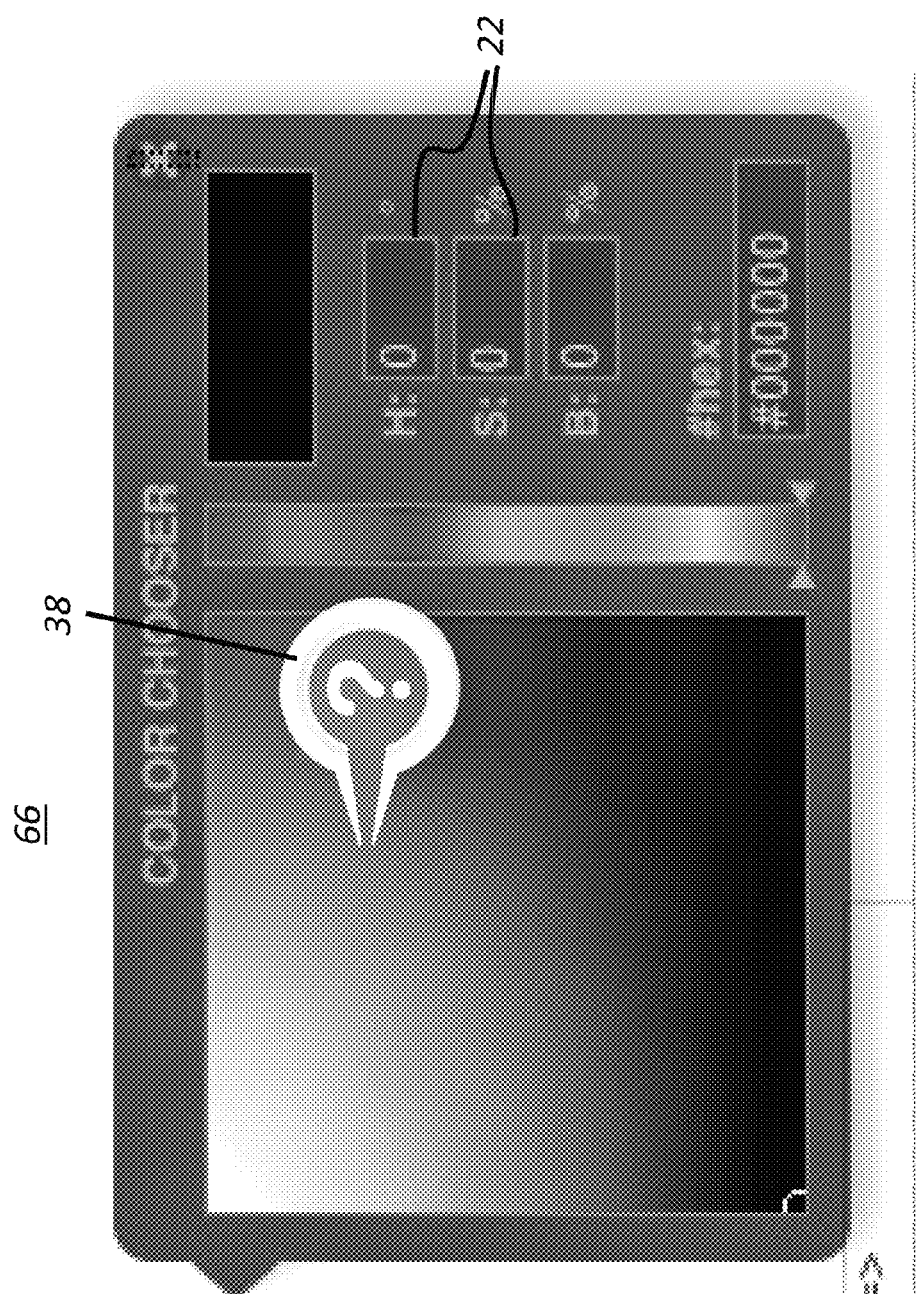
FIG. 11 shows a color chooser in the configuration program.

FIG. 11 shows a color choice tool 66 for setup of selectable button colors. This tool can be accessed, for example, by selecting the particular response prompt 20 and button using the window of FIG. 10. Color parameter values can be typed in directly into fields 22 or entered using a selector icon 38.

Figure 12A:
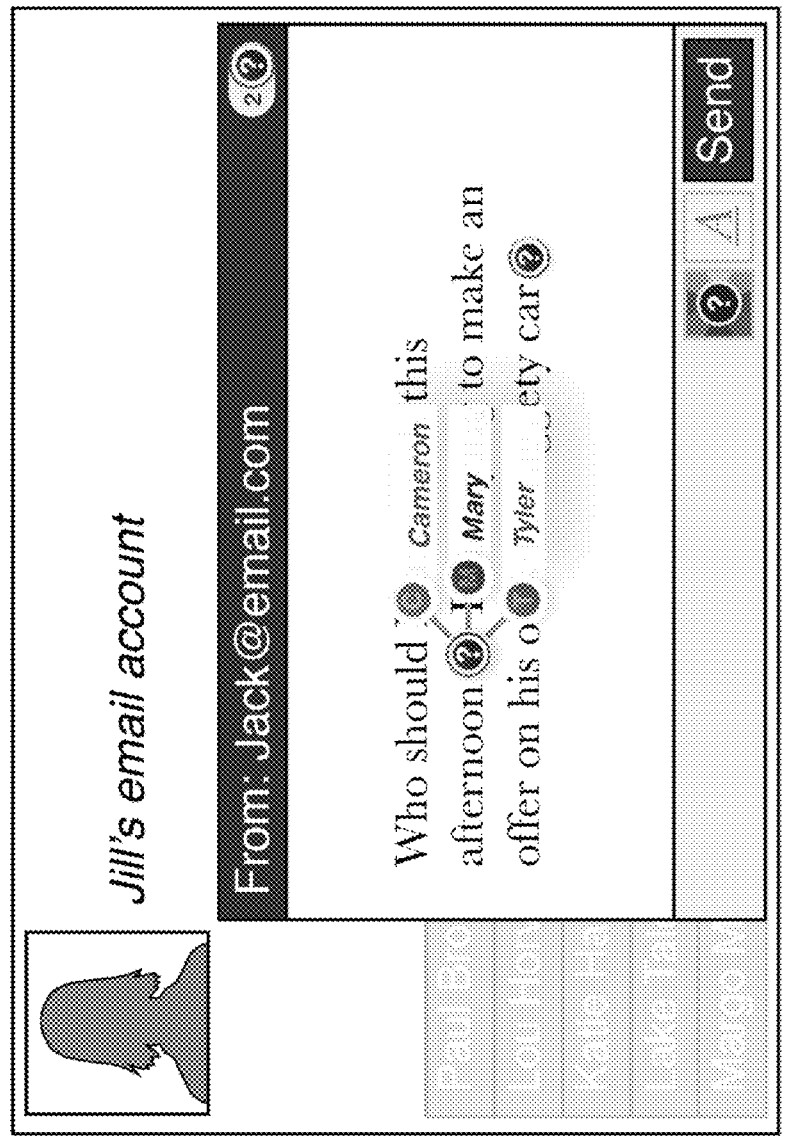
FIG. 12A shows a recipient response to a response prompt.
Figure 12B:
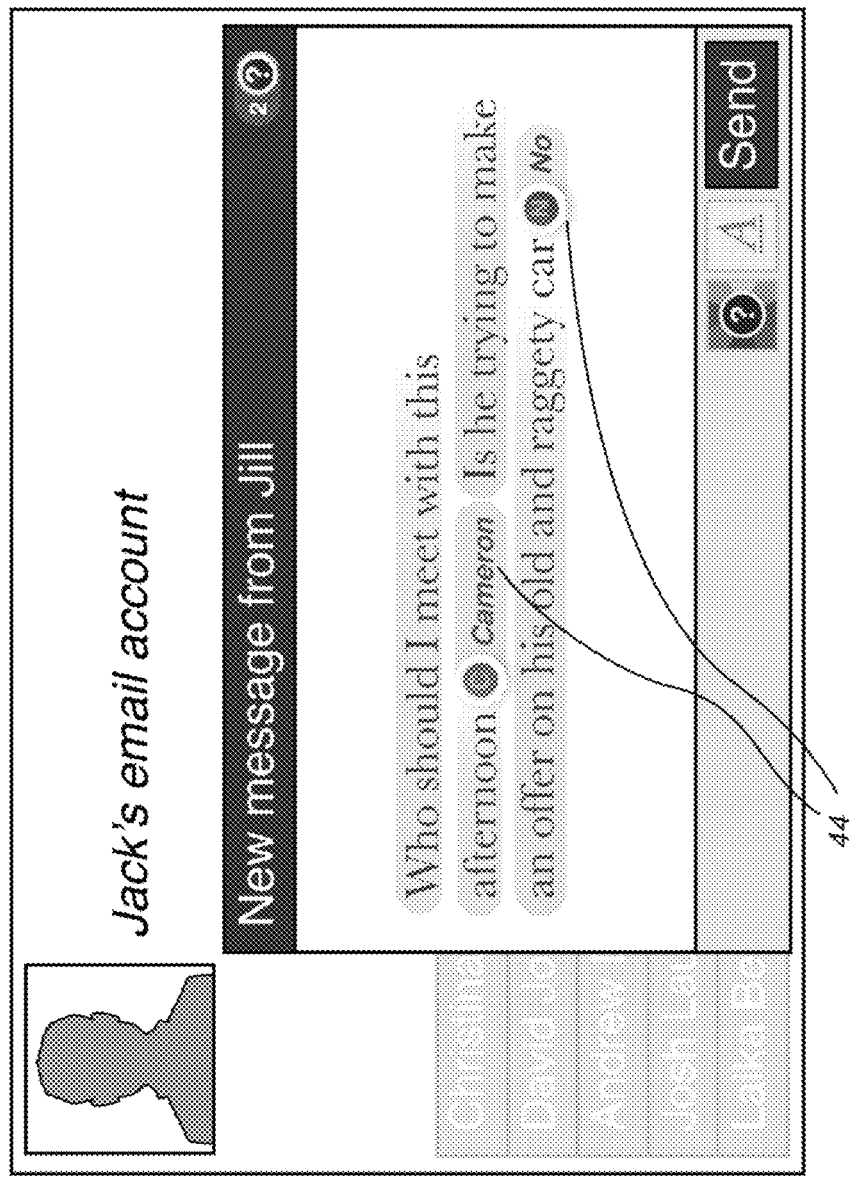
FIG. 12B shows display of the response at the sender's device.

FIGS. 12A and 12B show a sequence in which a response prompt that is answered by a recipient changes the display appearance of the sender. Here, a response prompt is sent from Jack to Jill in window 80*j* of FIG. 12A. Jill's response appears in Jack's email message display in a window 80*k* of FIG. 12B. Color shading or other highlighting is used to indicate response. Individual response selections 44 appear within the sender's original text, along with button icons.

Figure 13:
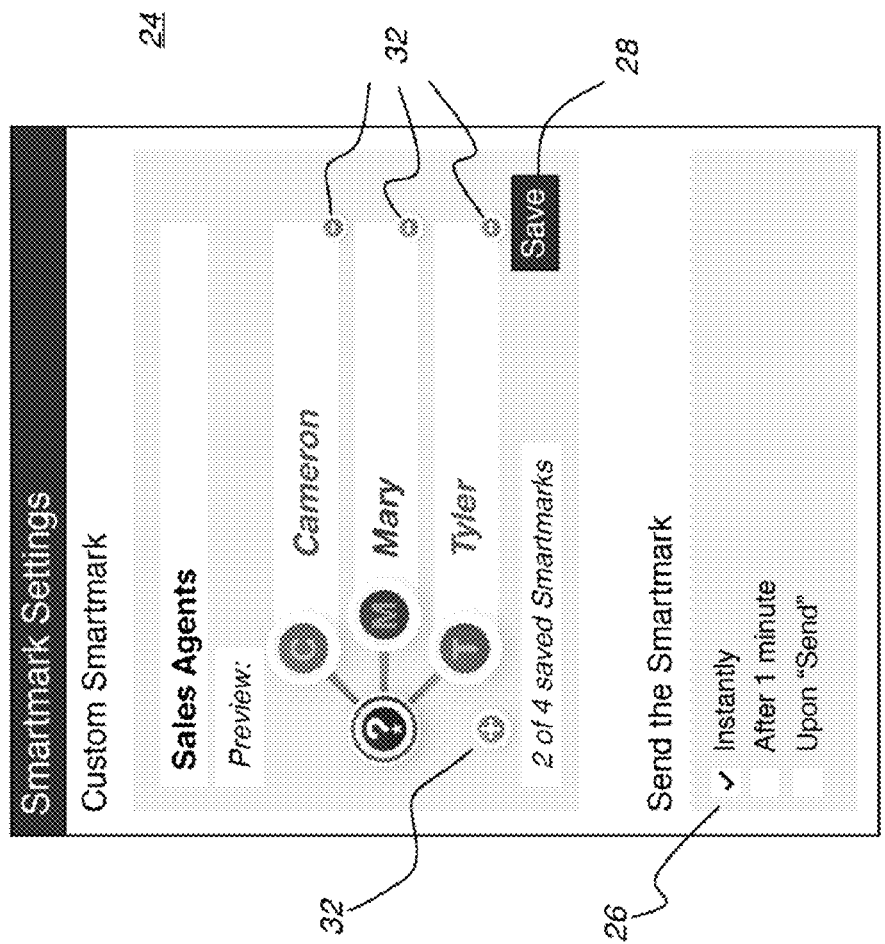
FIG. 13 shows a setup utility for response prompt setup.

FIG. 13 shows a setup utility 24 with additional options for labeling the selectable response buttons and setting the behavior of the response prompt with a behavior selection 26 once it has been received and viewed by the recipient. Some typical options include specifying when to send the response; other options can include keeping the icon active in the message text, applying an expiration date for icon lifetime, or displaying the icon only upon initially opening the email or other message. Plus (+) and minus (−) buttons 32 are provided for adding or removing selectable button options.

Figure 14:
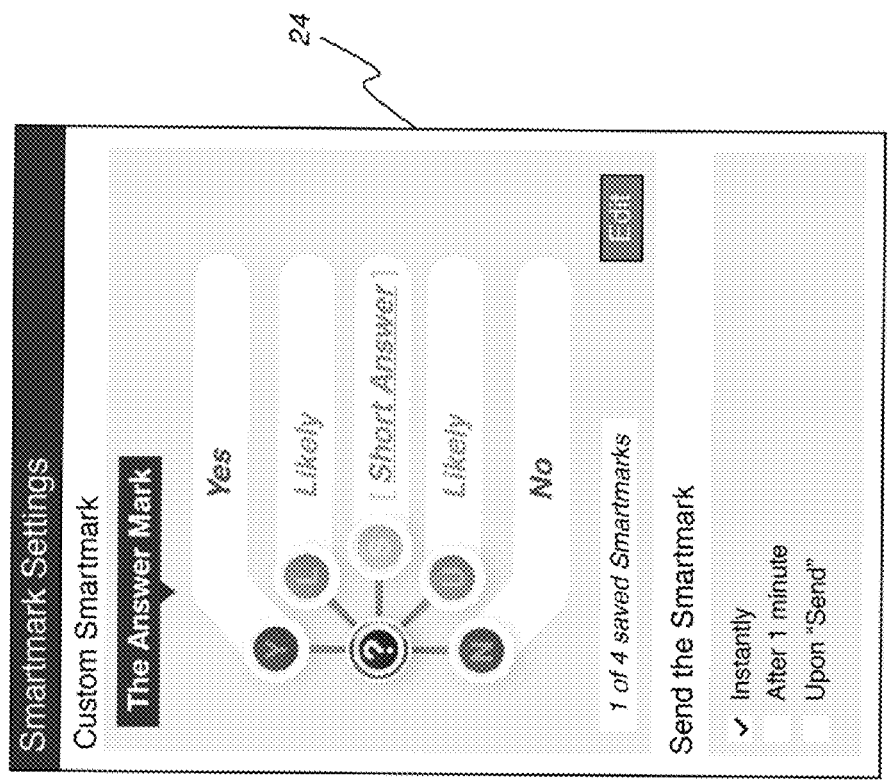
FIG. 14 shows a completed response prompt setup.

FIG. 14 shows setup utility 24 with response prompt setup completed.

More Complex Response Prompts and Tiered Responses

Figure 15A:
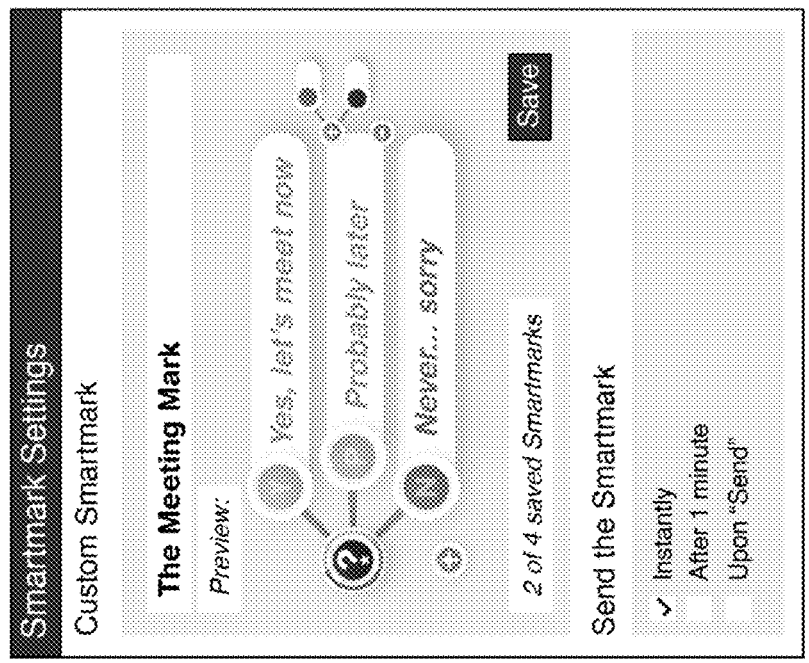
FIGS. 15A and 15B show setup for a tiered response for expanding further on a given response button.
Figure 15B:
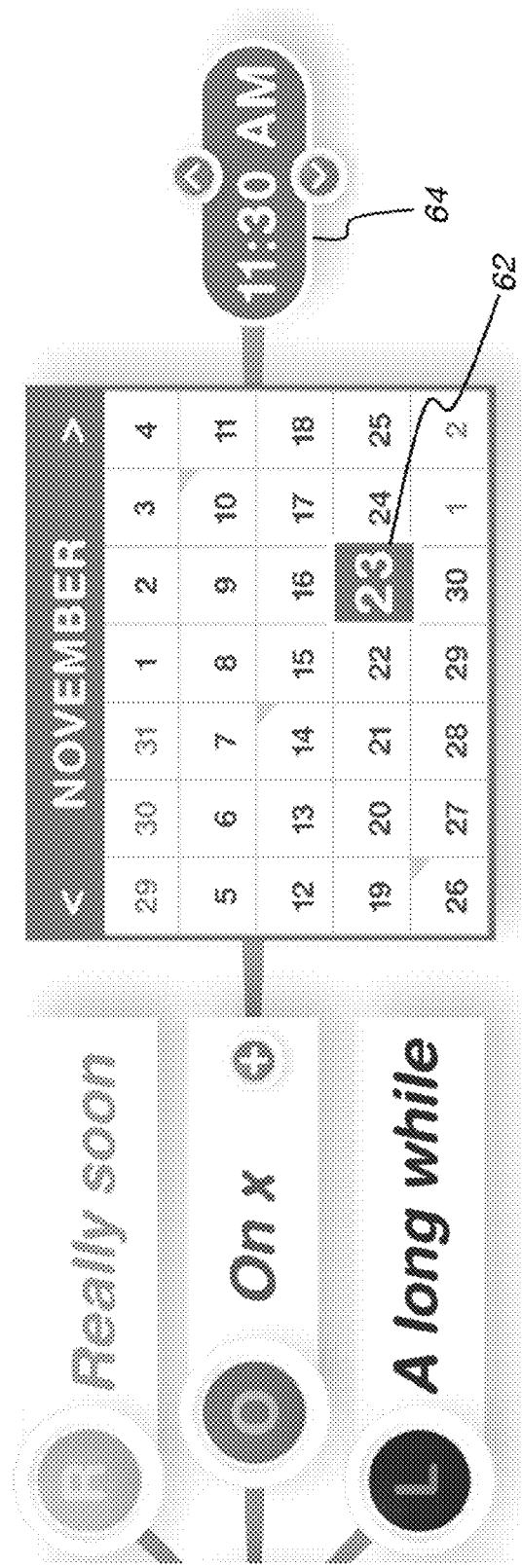

It can be appreciated that more complex response prompts 20 can be set up, including response prompts 20 that allow multiple levels or tiers. By way of example, FIGS. 15A and 15B show setup and display of a tiered response for expanding further on a given response button, including features such as selection of a calendar date 62 and time 64, for example.

Figure 15C:
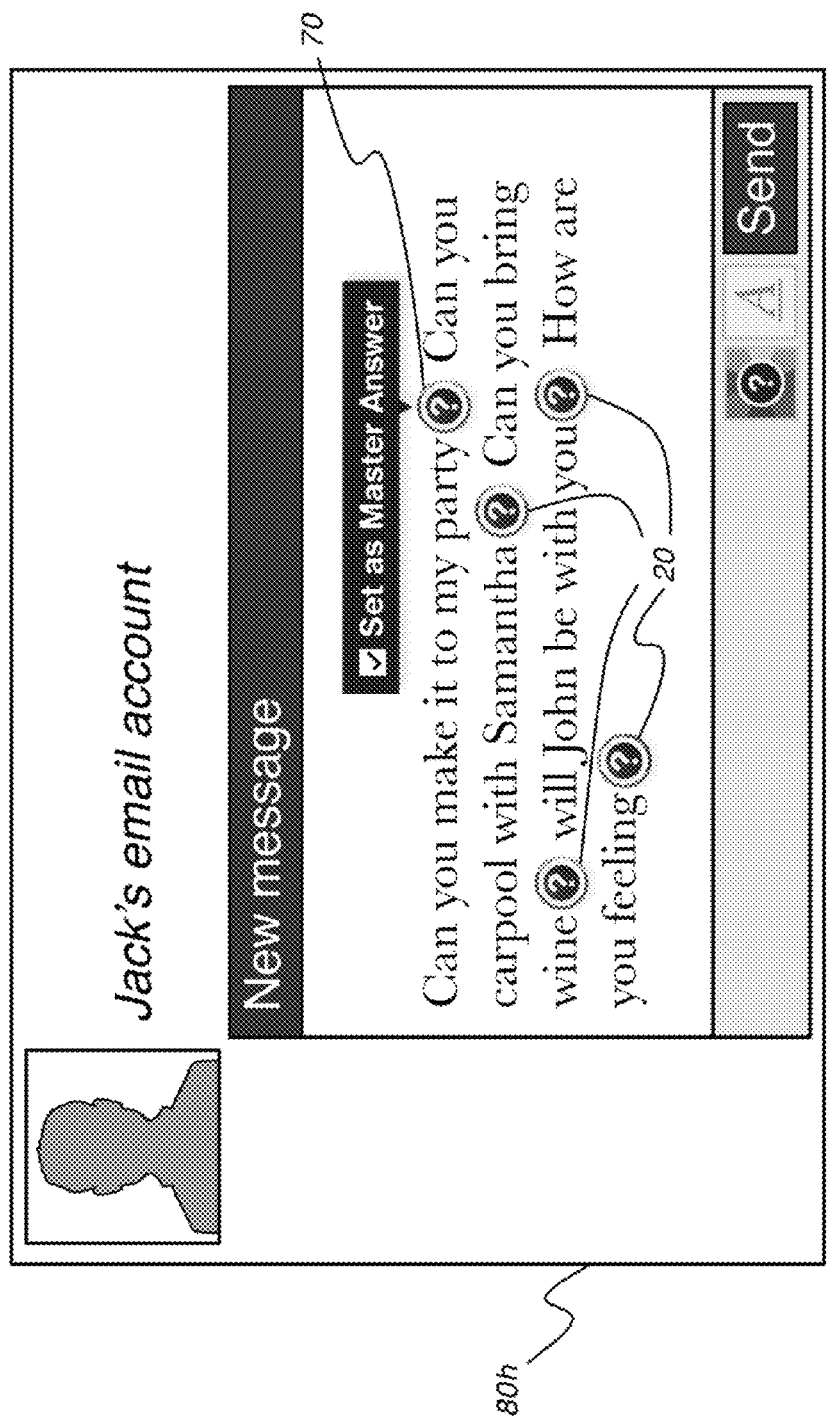
FIGS. 15C and 15D show contingent prompt conditions and displays.

In some cases, contingent conditions can be set up. For contingent conditions, a response to an initial first response prompt can determine whether or not subsequent prompts need to be answered and which prompts may or may not appear. FIG. 15C shows an initial question that determines whether or not subsequent prompts are meaningful. A master prompt 70 can typically be the first prompt in a text message that establishes a condition, such as attendance at an event, that is a prerequisite or "Master Answer" for subsequent questions. In the example shown for sender window 80*h*, a "no" response to the master prompt 70 terminates the remaining prompts 20 in the text message. The sender establishes master prompt 70 and its contingencies with an instruction entry, arranging the other prompts 20 as dependent upon the answer to master prompt 70.

Figure 15D:
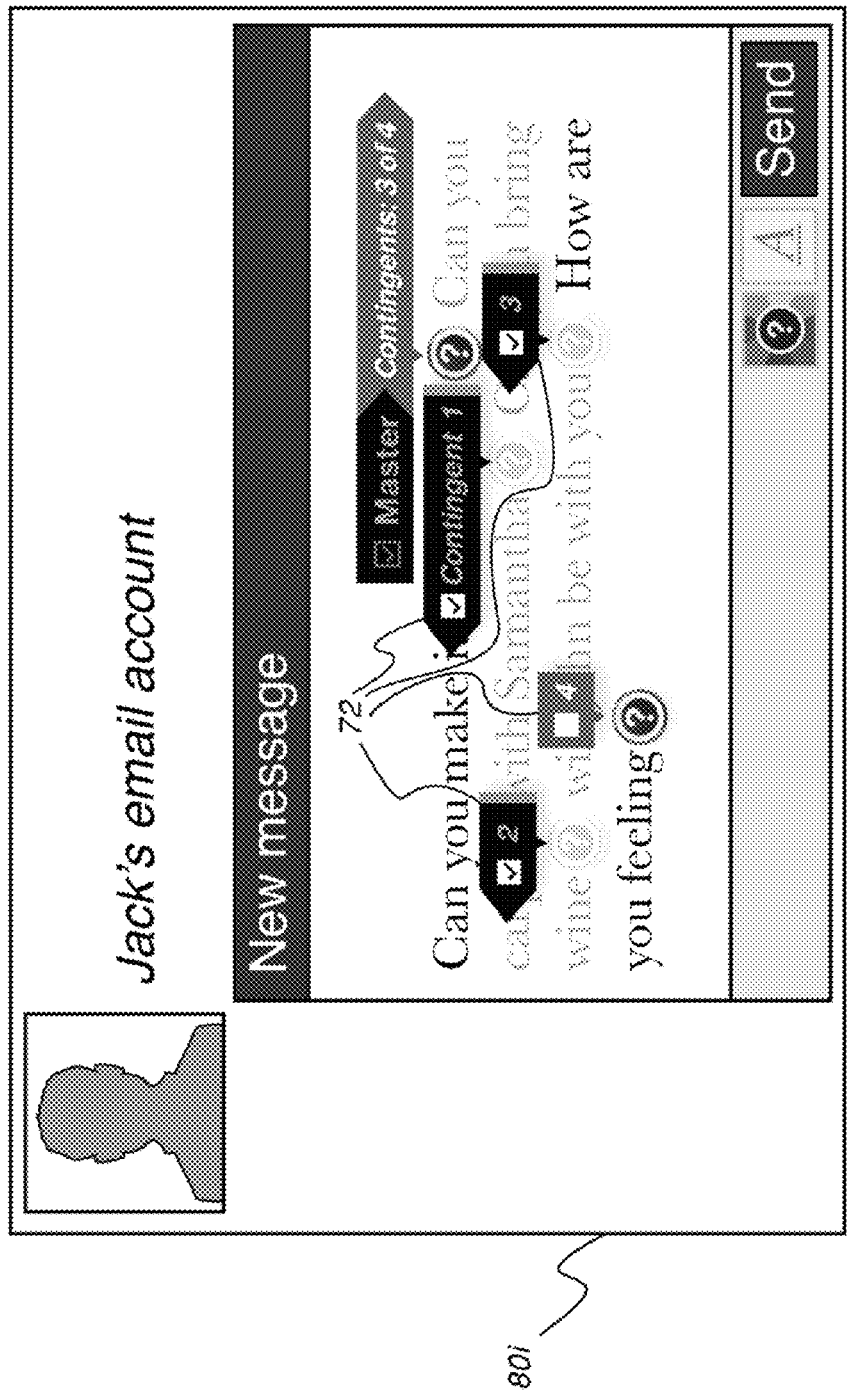
Figure 15E:
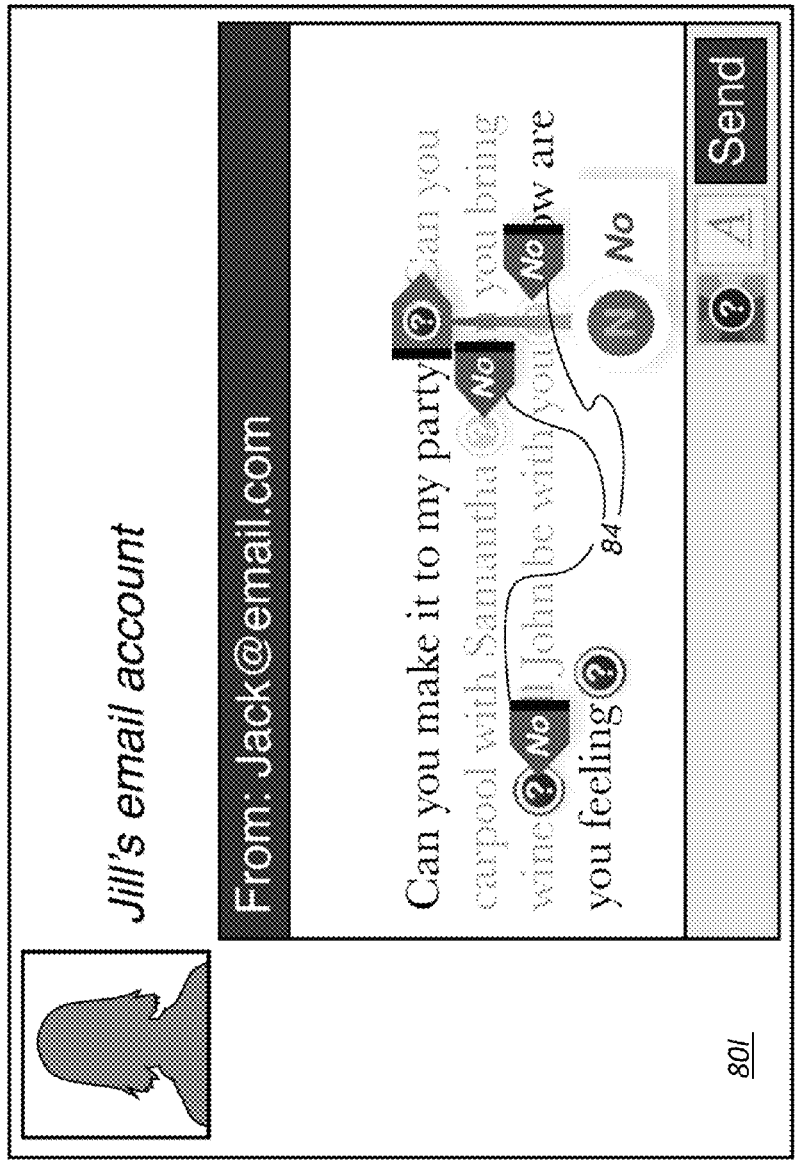
FIG. 15E shows a display with results of contingent condition selection.

There can be many ways to arrange answer options, with a number of similar short responses [i.e. Yes, Likely, Short Answer, Unlikely, and No] that can be used to quickly answer a question. However, more complex arrangements of questions and dependencies can be used. In FIG. 15D, a window 80i that displays on the sender device shows icons 72 indicating answered prompts and their contingent condition. Where a particular needed condition is not met, further prompts contingent on the particular condition may be excluded, grayed out, or otherwise treated to show contingence. An answer status indicator 84 shows the status of contingent responses. As shown in the recipient's email account in the example of window 80l in FIG. 15E, not all of the response prompt 20 responses may necessarily be contingent upon an initial condition. Thus, some of the contingent questions can be grayed or dimmed or even eliminated, while others persist in the message.

Figure 16A:
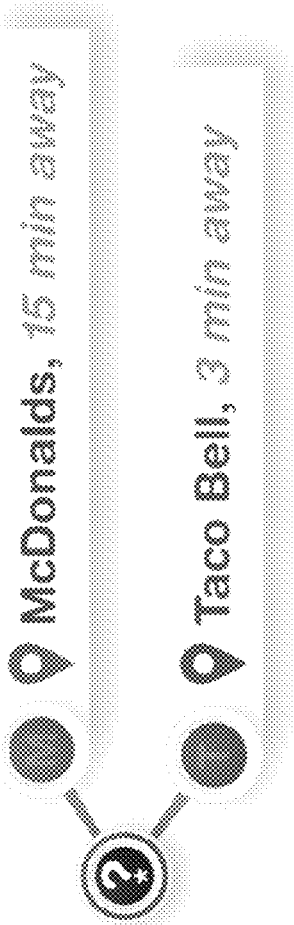
FIG. 16A shows an alternate form of the expanded response prompt for restaurant or entertainment selection.
Figure 16B:
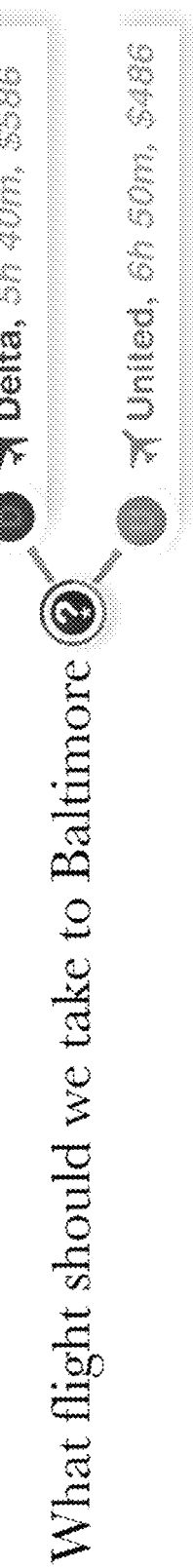
FIG. 16B shows an alternate form of the expanded response prompt for travel selection.

Embodiments of the present disclosure also allow the use of additional information, including dynamic information obtained from other utilities or apps on the personal communications device 100. For example, global positioning systems (GPS) information from the personal communications device 100, along with other information, can be used to locate a restaurant or other meeting-place as shown in FIG. 16A, listing the particular site as one of the operator-selectable options. FIG. 16B shows travel information that may be provided to the user in the form of recipient-actuable selection element options. A message and response prompt of this type can be generated by a travel service and sent to the customer within a message, for example. Other dynamically obtained information can include calendar data, contact list data, preferences data, and other information stored or accessible to the recipients personal communications device.

Figure 16C:
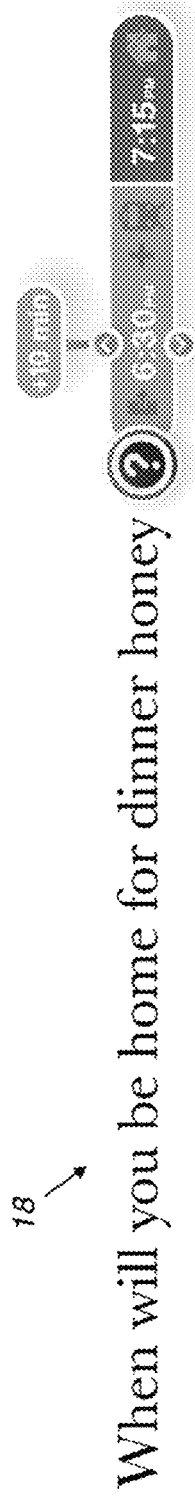
FIGS. 16C and 16D show an alternate form of the expanded response prompt for time entry.
Figure 16D:
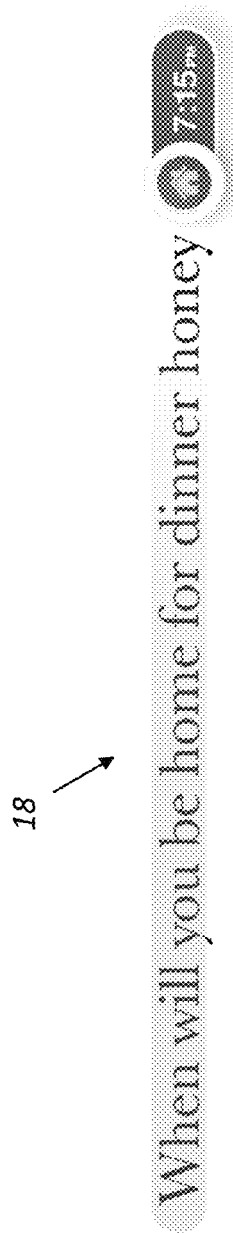

Embodiments of the present disclosure also accommodate responses of various types. FIG. 16C shows a query/response sequence that allows the recipient to specify a variable time value. FIG. 16C shows message 18 as provided by the sender for recipient indication of time. FIG. 16D shows message 18 on the sender's display following recipient response.

Figure 17A:
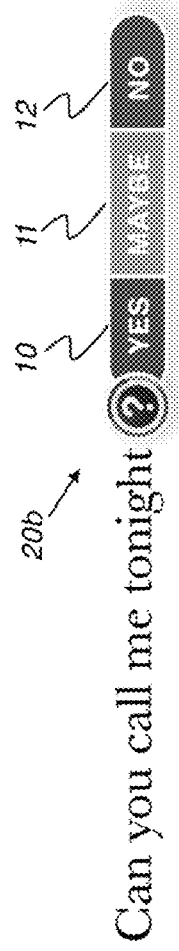
FIGS. 17A, 17B, 17C, and 17D show different versions of an expanded response prompt.
Figure 17B:
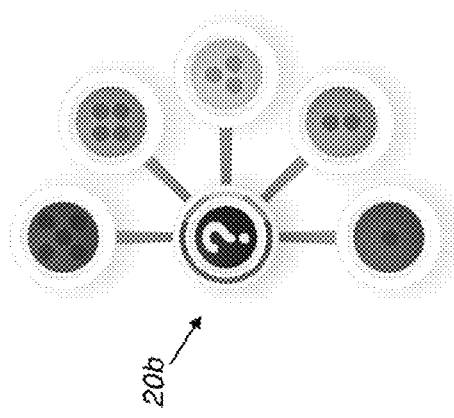
Figure 17C:
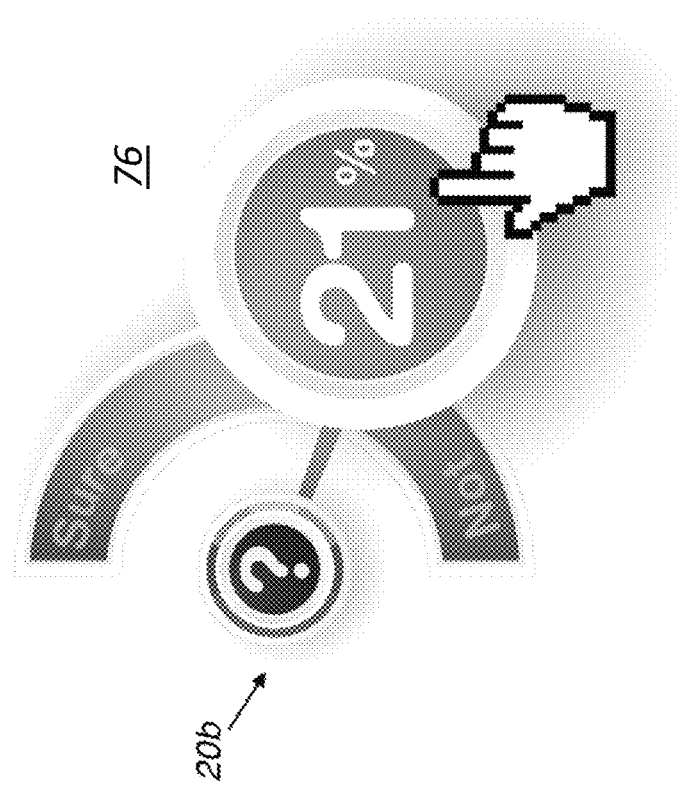

Optional symbols can be provided for response prompt 20 in its various states. FIG. 17A shows expanded icon 20b in a different format, with selectable buttons 10, 11, 12 or other type of recipient-actuable selection elements provided in linear fashion. FIG. 17B shows alternate appearance of expanded icon 20b using symbols as recipient-actuable selection elements. FIG. 17C shows a version of expanded icon 20b that allows selection of a variable value by the recipient, moving a finger or stylus as a type of "dial" along an arc or other path to change a displayed value. A dial, such as that shown in FIG. 17C, is one type of adjustable element 76 that provides a variable value. Other types of elements that provide variable values can include slide bars or other controls.

Figure 17D:
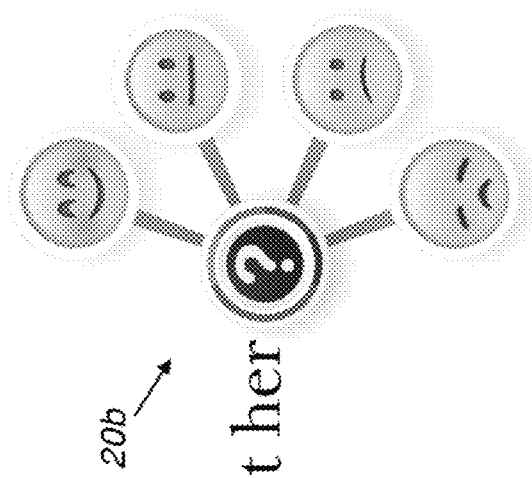

The alternate arrangement of FIG. 17D shows use of emoticons or other symbols as recipient-actuable selection elements to express opinion.

Figure 18:
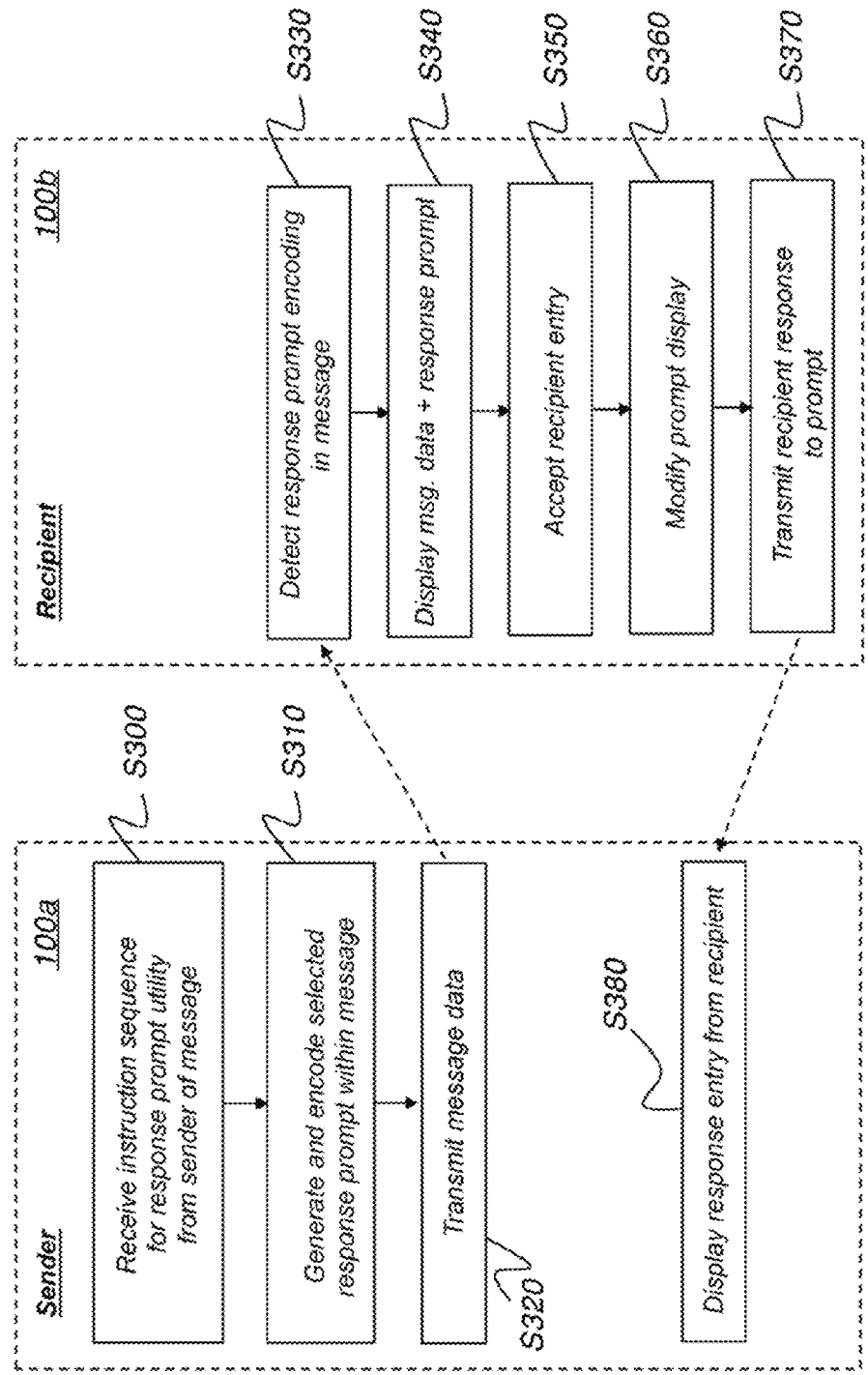
FIG. 18 is a flow diagram that shows steps for interaction using the configurable response prompt in message transmission.

FIG. 18 is a logic flow diagram that shows, from a processing perspective, the sequence of operations that occur at a personal communications device 100a of the sender and, in consequence, at a personal communications device 100b of the recipient. In a receive instruction step S300, the personal communications device 100a receives the instruction to include a particular response prompt 20 from the sender of a text or other message. As noted previously, this instruction may be entered using an on-screen icon or a keyboard control-key sequence, for example. The personal communications device 100a responds by displaying the response prompt 20 in the message that is being entered and encodes instructions associated with the selected response prompt 20 in an encoding step S310. The amount of information needed for encoding the response prompt 20 varies, depending on whether a standard response prompt 20 has been requested or a custom response prompt 20 is encoded, and depending on how the graphical user interface utility for the configurable response prompt is installed and actuated for operation. A transmission step S320 executes when the sender enters a Send instruction for the text message, email message, or other message, transmitting the text or other message data along with the encoded icon-related information.

Continuing with the sequence of FIG. 18, processing activity is now invoked at the recipient's personal communications device 100b. A detection step S330 detects the encoded content within the text data received by the recipient device 100b and determines the contents and overall setup of the response prompt 20 from the encoding. In a display step S340, the recipient's personal communications device 100b then displays the received message content along with the selected response prompt 20 according to the encoding. An accept entry step S350 then accepts the recipient's response entry, such as from a mouse, stylus, key press, or touch screen input from the recipient. A modify display step S360 executes, changing the appearance of the newly answered response prompt icon, as was described, for example, in FIGS. 2-5. A reply transmission step S370 then executes according to the predetermined time for response transmission, as described previously. For example, the response can be sent immediately, asynchronous with the recipient's typed response to the text message. Back at the sender's personal communications device 100a, a display response step S380 then updates the sender's display for the recipient's response, such as is shown in FIG. 8A, for example.

It can be appreciated that the sequence shown in FIG. 18 is exemplary and admits of any of a number of changes and alternatives, within the scope of the present disclosure, without departure from the claimed invention. The message that is sent can be a text message, but may also include image content or other message data content.

Figure 19:
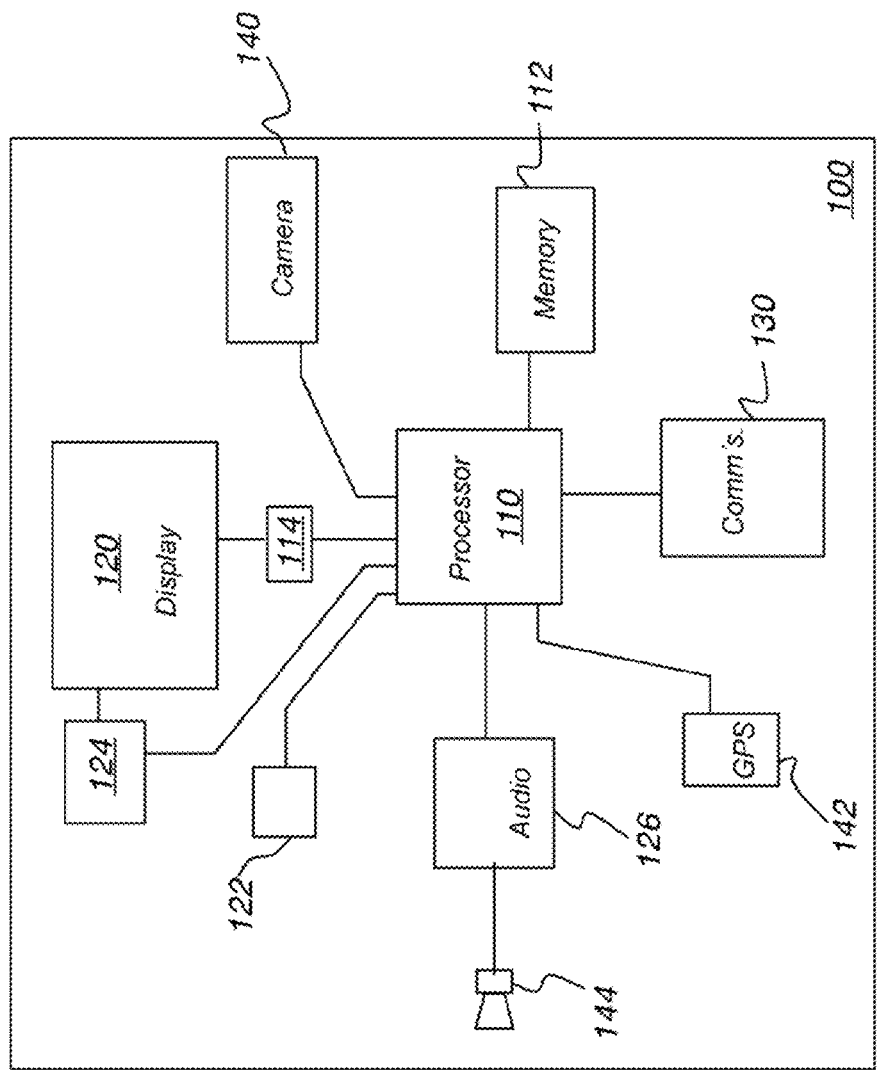
FIG. 19 is a schematic diagram that shows an example of a representative personal communications device that can be used to implement an embodiment of the present disclosure.

FIG. 19 is a schematic block diagram showing an example of a representative personal communications device 100 that can be used to implement an embodiment of the present disclosure such as that shown in the logic flow diagram of FIG. 18.

As noted previously, personal communications device 100 is intended to represent various forms of digital computers, such as laptops, desktops, workstations, personal digital assistants, and other appropriate computers, or various forms of mobile devices, such as personal digital assistants, computer tablets, cellular telephones, smart phones, smart watches, and other similar computing devices. The components shown here, their connections and relationships, and their functions, are meant to be exemplary only, and are not meant to limit implementations of the inventions described and/or claimed in this document.

Personal communications device 100 includes a control logic processor 110 that is in signal communication with a number of other components, including a memory 112, a display interface 114, a display 120, a communications interface 130, an optional external interface 122, and audio circuitry 126. Power circuitry is not shown and may include battery or line power components that provide the necessary power for circuitry operation. Numerous connections and support components are not shown, but are familiar to those skilled in the electronic design arts.

Control logic processor 110 can execute instructions within personal communications device 100, including instructions stored in the memory 112. The processor 110 may be implemented as a chipset of one or more chips that include separate and multiple analog and digital processors. Control logic processor 110 may provide, for example, for coordination of the other components of personal communications device 100, such as control of user interfaces, applications run by personal communications device 100, and wireless communication by device 100. Control logic processor 110 can be programmed by instructions to execute a graphical user interface utility that performs the needed logic and control functions for setup, display, and operation of the configurable response prompt 20 described previously. The instructions for prompt 20 functions may be resident in memory 112 or may be downloaded from another processor. The instructions that configure processor 110 for the task of executing the graphical user interface utility can be resident on device 100 or can be downloaded as part of a transmitted message or downloaded from some other processor as needed. The set of software instructions, executed by the control logic processor and associated logic components, effectively form a special-purpose machine that is programmed to perform the functions described herein for display and interaction with the configurable response prompt.

Control logic processor 110 can obtain user instructions through an operator instruction interface 124 that works with display 120. Operator instruction interface 124 can be integral with display 120 when configured as a touch screen, so that finger or stylus contact is used for instruction entry. Alternately, operator instruction interface 124 can be a keypad, mouse, joystick, or other instruction entry device.

Display 120 may be, for example, a TFT LCD (Thin-Film-Transistor Liquid Crystal Display) or an OLED (Organic Light Emitting Diode) display, or other appropriate display technology. The display interface 114 may comprise appropriate circuitry for driving the display 120 to present graphical and other information to a user. The operator instruction interface 124 may receive commands from a user and convert them for submission to control logic processor 110. In addition, an optional external interface 122 may provide communication with control logic processor 110 to allow transfer of data or instruction with other devices. An optional camera 140 can also be in signal communication with control logic processor 110 for capture and display of still or video image content. Communications interface 130 provides wireless or wired, or both wireless and wired, communication with remote processors and other personal communications devices 100. Multiple communications interfaces 130 can be used.

For operation and transfer of text and other data, memory 112 is in signal communication with control logic processor 110. Memory 112 stores information and serves as work space for storage and execution of programmed instructions within personal communications device 100, including instructions that display and operate the graphical user interface utility that provides the configurable response prompt 20 of the present disclosure. Memory 112 can be implemented as one or more of a computer-readable medium or media, a volatile memory unit or units such as any of a number of types of Random-Access Memory (RAM), or a non-volatile memory unit or units. An optional expansion memory (not shown) may also be provided, which may include, for example, a SIMM (Single In Line Memory Module) card interface. Such expansion memory may provide extra storage space for personal communications device 100 or may also store applications or other information for personal communications device 100. Expansion memory may include instructions to carry out or supplement the processes described above, and may include secure information also, such as when provided as part of a security module, programmed with instructions that permit secure use of personal communications device 100. In addition, secure applications may be provided via the SIMM cards, along with additional information, such as placing identifying information encoded on the SIMM card.

Memory 112 may include, for example, flash memory and/or NVRAM memory. According to an embodiment of the present disclosure, a computer program product is tangibly embodied in an information carrier. The computer program product contains instructions that, when executed, perform one or more methods, such as those described above. The information carrier is a computer- or machine-readable medium, that supplements or provides memory 112, such as connected using external interface 122.

Personal communications device 100 may communicate wirelessly through communication interface 130, which may include digital signal processing circuitry where necessary. Communication interface 130 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver circuitry as part of communication interface 130. In addition, short-range communication may occur, such as using a Bluetooth, WiFi, or other such transceiver (not shown). In addition, a GPS (Global Positioning system) receiver module 142 may provide additional navigation- and location-related wireless data to personal communications device 100, which may be used as appropriate by applications running on personal communications device 100.

Personal communications device 100 may also communicate audibly using audio circuitry 126, which may alternately receive spoken information from a user and convert it to usable instructions or other digital information. Audio circuitry 126 may likewise generate audible sound for a user, such as through a speaker 144, e.g., in a handset of personal communications device 100. Such sound may include sound from voice telephone calls, may include recorded sound (e.g., voice messages, music files, etc.) and may also include sound generated by applications operating on personal communications device 100.

Personal communications device 100 may be implemented in a number of different forms, as shown in FIG. 19. For example, it may be implemented as a cellular telephone. It may also be implemented as part of a smart phone, personal digital assistant, computer tablet, or other similar portable device.

Personal communications device 100 can allow access to its Applications Programming Interface (API) for software instructions that execute as part of the response prompt software. Thus, for example, the response prompt routines can access information from a calendar utility, contact list, or other resource of the personal communications device 100.

Implementations of the various techniques described herein may be executed using instructions stored in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Some or all of the method steps also may be performed by, and an apparatus may be implemented as, special purpose logic circuitry, e.g., an FPGA (field programmable gate array) or an ASIC (application-specific integrated circuit).

Processors suitable for the execution of a computer program as control logic processor 110 as described herein include, by way of example, both general and special purpose microprocessors, and any one or more processors of any kind of digital computer. Generally, a processor will receive instructions and data from a non-transitory memory, such as a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile and/or non-transitory memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, various embodiments of the present disclosure may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

The present application describes a graphical user interface utility for eliciting and acquiring a response to a sender of an electronic text message transmission from a message recipient, the utility comprising a base response prompt that displays to the recipient as part of the text message, wherein selection of the base response prompt by the recipient displays a set having a plurality of selection buttons, wherein each member of the set of selection buttons has an associated response signal, and wherein, when a selection button is selected by the recipient, the corresponding response signal is transmitted back to the sender. The application further describes wherein the base response prompt appearance changes when the selection button is selected, under control of the graphical user interface utility. The plurality of selection buttons can be of different colors. The response signal can be transmitted immediately upon selection.

From another alternate aspect of the present invention, there is provided a method for obtaining a response from an email or other text message recipient, the method comprising: responding to an instruction from an email sender by displaying, on a computer screen of the email recipient, the sent email along with a graphical icon, wherein the graphical icon, when selected by the recipient, displays at least first and second selectable buttons, wherein each of the at least first and second selectable buttons has a corresponding response message; and transmitting, to the email sender, the response message corresponding to selection of the first selectable button by the email recipient.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the response prompt can have any of a number of different presentation formats. Thus, what is provided is an apparatus and method for obtaining recipient response using a graphical element inserted in an email message.

The invention claimed is:

1. A graphical user interface utility for message transfer between a sender at a sender personal communications device and a recipient at a recipient personal communications device, the utility comprising:
   a setup utility that generates and stores a customized base response prompt having an associated plurality of recipient-actuable selection elements, each selection element having a corresponding response answer entry;
   an instruction sequence that associates the customized base response prompt with a text string that is within a message and inserts the customized base response prompt into the message for transmission;
   a recipient display utility on the recipient personal communications device that executes stored instructions to:
   (a) display the base response prompt and its associated text string from the transmitted message content;
   (b) respond to selection of the base response prompt by displaying the generated plurality of recipient-actuable selection elements and corresponding associated response answer entries, the selection elements spaced apart from the displayed base response prompt;

(c) transmit a response signal back to the sender device in response to operator actuation of a selected recipient-actuable selection element;
and
a sender device display utility that responds to the received response signal from the recipient device by displaying:
(i) the text string from the sender message that was associated with the base response prompt;
(ii) the selected recipient-actuable selection element; and
(iii) the corresponding response answer entry to the text string according to the selected recipient-actuable selection element.

2. The utility of claim 1 wherein the recipient-actuable selection element is a selectable screen button.

3. The utility of claim 2 wherein the associated response signal is transmitted immediately upon recipient selection.

4. The utility of claim 2 wherein the associated response signal is transmitted along with the recipient's entered message reply.

5. The utility of claim 1 wherein the base response prompt further displays in the message data that appears on the sender personal communications device.

6. The utility of claim 1 wherein the base response prompt further changes its appearance according to the recipient selection.

7. The graphical user interface utility of claim 1 wherein instructions to configure the display of the recipient-actuable selection elements of the selected base response prompt are inserted into the electronic message from the sender personal communications device.

8. The graphical user interface utility of claim 1 wherein instructions to configure the display of the recipient-actuable selection elements of the selected base response prompt are stored on the recipient personal communications device.

9. The utility of claim 1 wherein later selection of an alternate recipient-actuable selection element on the recipient device causes the sender device to redisplay the text string associated with the base response prompt, the alternate recipient-actuable selection element, and the corresponding response answer entry to the text string according to the alternate selection element.

10. A method for message transfer between a sender at a sender personal communications device and a recipient at a recipient personal communications device, the method comprising:
a) generating, at the sender personal communications device, a customized base response prompt having at least a first and a second recipient-actuable selection element, each selection element having a corresponding response answer entry;
b) associating the customized base response prompt with a query text string within a transmit message;
c) transmitting, from the sender personal communications device, the transmit message having the query text string with the associated customized base response prompt;
d) displaying, at the recipient personal communications device, the transmit message with the query text string and its associated base response prompt;
e) responding to recipient selection of the base response prompt by displaying at least the first and a second recipient-actuable selection elements, wherein at least the first recipient-actuable selection element displays an associated response answer entry;
f) responding to selection of the first recipient-actuable selection element by transmitting a response signal corresponding to the associated response answer entry to the sender device;
and
g) responding to the received response signal at the sender device by displaying:
(i) the query text string;
(ii) the first recipient-actuable selection element; and
(iii) the associated response message.

11. The method of claim 10 wherein the transmit message is a text message.

12. The method of claim 11 wherein the response signal is transmitted back to the sender personal communications device separately from transmitting a text response to the transmit message.

13. The method of claim 11 wherein the response signal is transmitted back to the sender personal communications as part of a text response to the transmit message.

14. The method of claim 10 wherein selection by the recipient is done using a touch screen.

15. The method of claim 10 wherein one or more of the first and second recipient-actuable selection elements comprises an adjustable element that provides a variable value.

16. The method of claim 15 wherein the variable value is provided from a global positioning system.

17. The method of claim 15 wherein the variable value is provided from an application program that executes on the sender or recipient personal communications device.

18. The method of claim 10 wherein the query text string is a first query text string and the customized base response prompt is a first customized base response prompt, and further comprising:
generating a second customized base response prompt, wherein the second customized base response prompt has corresponding third and fourth recipient-actuable selection elements; and
associating the second customized base response prompt with a second query text string within the transmit message.

19. The method of claim 18 further comprising the step of displaying or not displaying the second query text string and second customized base response prompt according to the recipient selection of either the first or second recipient-actuable selection element.

20. The method of claim 10 wherein generating the customized base response prompt further comprises assigning a response timing for either instant or delayed transmission upon recipient selection of the recipient-actuable selection element.

* * * * *